United States Patent [19]
Kato et al.

[11] Patent Number: 5,631,517
[45] Date of Patent: May 20, 1997

[54] ULTRASONIC MOTOR AND DRIVING FOR THE ULTRASONIC MOTOR

[75] Inventors: Kazuo Kato, Toukai-mura; Takashi Sase, Hitachi; Kikuo Tomita, Hitachioota; Shuzo Oshima, Mizusawa; Muneo Chiba, Chigasaki; Tomohiko Douken, Hitachi; Kazuyoshi Takizawa, Hiratsuka, all of Japan

[73] Assignees: Hitachi, Ltd., Tokyo; Hitachi Media Electronics Co. Ltd., Misusawa, both of Japan

[21] Appl. No.: 439,062

[22] Filed: May 8, 1995

[30] Foreign Application Priority Data

| May 23, 1994 | [JP] | Japan | 6-108099 |
| May 26, 1994 | [JP] | Japan | 6-112443 |

[51] Int. Cl.⁶ .................................. H01L 41/08
[52] U.S. Cl. ........................................... 310/323
[58] Field of Search ............................ 310/323, 328

[56] References Cited

U.S. PATENT DOCUMENTS

| 4,833,358 | 5/1989 | Suzuki et al. | 310/316 |
| 4,868,446 | 9/1989 | Kumada | 310/323 |
| 4,945,275 | 7/1990 | Honda | 310/323 |
| 5,332,941 | 7/1994 | Honda | 310/323 |

FOREIGN PATENT DOCUMENTS

| 62-85684A | 4/1987 | Japan . |
| 63-181676A | 7/1988 | Japan . |
| 63-181677A | 7/1988 | Japan . |
| 63-257474A | 10/1988 | Japan . |
| 63-302774A | 12/1988 | Japan . |

OTHER PUBLICATIONS

Takashi Maeno, et al., "FE Analysis and LDA Measurement of the Dynamic Rotor/Stator Contact in a Ring-Type Ultrasonic Motor", Journal of Tribology, Transactions of ASME, vol. 115, Oct. 1993, pp. 625-631.

Minoru Kurosawa, "Drive and Control Method of Ultrasonic Motor", Kikaisekkei, vol. 36, No. 8, Jul. 1992, pp. 69-76.

Akio Kumada, "Ultrasonic Motors", Journal of Electronics, Information & Communication Association, vol. 72, No. 4, Apr. 1989, pp. 462-468.

*Primary Examiner*—Mark O. Budd
*Attorney, Agent, or Firm*—Kenyon & Kenyon

[57] ABSTRACT

An electrostrictive revolution type ultrasonic motor includes a piezoelectric ceramic disk shaped stator and a rotor. The piezoelectric ceramic disk shaped stator has an eccentric movement via excitation by two phase pulse like voltage. The rotor is fitted around the circumference of the stator and is transmitted by a rotating torque due to the eccentric movement via frictional contact therebetween. The rotor is formed of a plastic material by injection molding to achieve a reduction of a size variation of the rotor and a stable contact with the stator. A high and stable rotating torque is thereby obtained with a reduced production cost. Further, a driving device for the ultrasonic motor which varies the frequency of a voltage applied to the ultrasonic motor in a stepped manner discriminates the magnitude of the corresponding motor currents and drives the ultrasonic motor with the frequency which causes the maximum motor current. In this manner, a simple structured and low cost driving device which operates at a high speed and at a high resolution with a high efficiency is achieved.

7 Claims, 13 Drawing Sheets

FIG. 7A
FIG. 7B
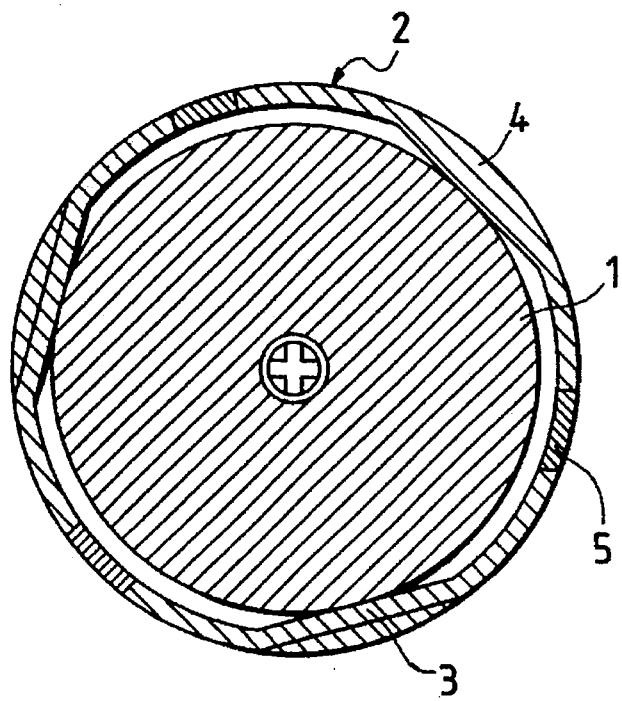
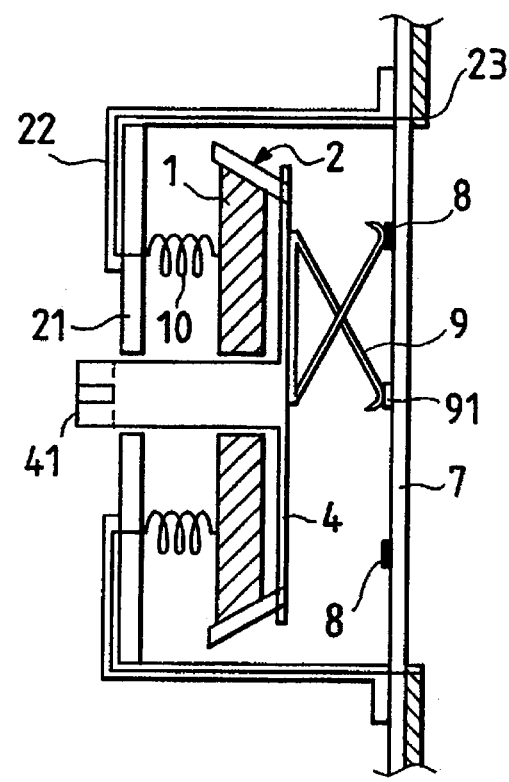

| SELECTOR OUTPUT SWITCH | | M1 DRIVER | | M2 DRIVER | |
|---|---|---|---|---|---|
| | | CW | CCW | CW | CCW |
| 1ST PHASE | Q1 | 1 1 0 0 | 1 1 0 0 | 1 1 0 0 | 1 1 0 0 |
| | Q2 | 0 0 1 1 | 0 0 1 1 | 0 0 1 1 | 0 0 1 1 |
| | Q3 | 0 0 1 1 | 0 0 1 1 | 0 0 0 0 | 0 0 0 0 |
| | Q4 | 1 1 0 0 | 1 1 0 0 | 0 0 0 0 | 0 0 0 0 |
| | Q5 | 0 0 0 0 | 0 0 0 0 | 0 0 1 1 | 0 0 1 1 |
| | Q6 | 0 0 0 0 | 0 0 0 0 | 1 1 0 0 | 1 1 0 0 |
| 2ND PHASE | Q7 | 0 1 1 0 | 1 0 0 1 | 0 1 1 0 | 1 0 0 1 |
| | Q8 | 1 0 0 1 | 0 1 1 0 | 1 0 0 1 | 0 1 1 0 |
| | Q9 | 1 0 0 1 | 0 1 1 0 | 0 0 0 0 | 0 0 0 0 |
| | Q10 | 0 1 1 0 | 1 0 0 1 | 0 0 0 0 | 0 0 0 0 |
| | Q11 | 0 0 0 0 | 0 0 0 0 | 1 0 0 1 | 0 1 1 0 |
| | Q12 | 0 0 0 0 | 0 0 0 0 | 0 1 1 0 | 1 0 0 1 |

ULTRASONIC MOTOR AND DRIVING FOR THE ULTRASONIC MOTOR

BACKGROUND OF THE INVENTION

The present invention relates to an ultrasonic motor and a CRT display device using the ultrasonic motor. More specifically, the present invention relates to an electrostrictive revolution type ultrasonic motor having an improved rotor structure.

The present invention further relates to a driving device for an ultrasonic motor which is required to be driven under a predetermined frequency such as under a resonant condition of the ultrasonic motor as a load.

An ultrasonic motor is utilized as a servo motor in a precise adjustment mechanism because of the ability which permits a very fine operation without necessitating interposing of such as a reduction gear and of a large holding torque during no voltage application. In particular, a so called electrostrictive revolution type ultrasonic motor, which makes use of a disk shaped ceramic piezoelectric stator of which center of gravity precessions through excitation by ultrasonic input power as disclosed in JP-A-63-257474 and JP-A-63-181676 which partly corresponds to U.S. Pat. No. 4,868,446, is suitable for reducing the size and cost thereof because of its comparatively simple structure thereof.

FIGS. 9A and 9B show a structure of a conventional electrostrictive revolution type ultrasonic motor. The ultrasonic motor as illustrated in FIGS. 9A and 9B is constituted by a disk shaped stator 1 formed by a piezo-electric element of ferroelectric substance subjected to a polarization treatment in advance such as PZT, a rotor 2 formed from a phosphor bronze plate in Petri dish shape through drawing and fitted around the circumference of the stator 1, an insulator spacer 6 of Mylar for preventing short circuiting between electrodes formed on the surface of the stator 1 and the metallic rotor 2 and others. The rotor 2 is provided with three projecting portions 3 formed by drawing and the rotor 2 contacts the outer circumference of the stator 1 via these projecting portions 3 with a proper contacting pressure.

For divided fan shaped electrodes 11 through 14 are formed by spattering on both faces of the stator 1 and one of the electrodes on the front face thereof is connected to the electrode on the back face thereof facing in 180° relation each other so as to constitute two sets of electrodes corresponding to two phases. Further, the two sets of the electrodes are constituted to receive two phase pulse like voltage of which frequency is tuned to the resonant frequency via a coil spring (not shown) so as not to disturbe the mechanical resonance of the stator 1. The details for driving the stator are disclosed in the above indicated patent documents, therefore the explanation thereof is omitted in the present specification. In the ultrasonic motor as illustrated in FIGS. 9A and 9B having the above explained structure, one electrode portion of the stator 1 slightly expands, normally below 1μm, in response to the polarity of the applied pulse like voltage, and the other portion displaced by 180° with respect to the one electrode portion contracts, as a result, the center of gravity of the stator 1 moves eccentrically thereby to cause a so called precession. Such motion is transferred to the projecting portions 3 of the rotor 2 via frictional contact and induces a rotating torque in the rotor 2 to rotate the same.

However, with the conventional ultrasonic motor having the above explained structure, the generated rotating torque is small, variation of the generated rotating torque is large by product by product and a complex and fine adjustment of the spring pressure of the respective projecting portions was indispensable. Further, even when a necessary rotating torque is generated, a time depending torque variation due to such as damaging of the stator contacting face was large, therefore the ultrasonic motor having the above explained structure has not been reduced into practice as a mass-producable product until now. Still further, since metal is used for the rotor material in the conventional ultrasonic motor, such ultrasonic motor is not suitable for an application wherein mutual action or interference with respect to electric field and magnetic field causes problems, for example, an application for a flyback voltage adjustment for focusing adjustment in a CRT display device in which an intense electro-magnetic field is generated or a medical use electronic measurement equipment in which a slight electro-magnetic disturbance causes problems.

According to experimental study performed by the present inventors, it is found out that the above conventional problems are caused by the rotor formed from a phosphor bronze plate through drawing method. The drawing is an only method of forming a thin spring material such as a phosphor bronze plate in mass-production scale, however it is found out that the variation in the dimensional accuracy through such drawing reaches about ±50μm, and such variation is too large exceeding an allowable variation of about ±15μm for flexing amount when the rotor of the electrostrictive revolution type ultrasonic motor is contacted. Further, it is also found out that hardness change due to stress during spreading by the drawing operation causes variation. Still further, because of a high hardness of the contacting portion of the rotor which is formed from a metallic spring material the stator contacting face is likely to be damaged in time depending manner during the contacting rotation which brings about a large variation of frictional contacting force and a time depending change thereof.

An ultrasonic motor is one examples which can operate only by a predetermined frequency signal called as a resonant frequency signal. Such a machine necessitates a so called frequency tracking operation in which the operating frequency is tuned to the resonant frequency prior to the primary control operation thereof in order to maintain the resonant condition in response to the state change of the machine.

An ultrasonic motor generates a maximum torque at its resonant condition and when the operating frequency deviates from the resonant frequency, the torque generation is either extremely reduced or totally ceased to stop the operation of the motor such that the resonant frequency tracking operation is an indispensable measure so as to ensure a stable operation of the ultrasonic motor even under temperature change and load variation thereof.

Conventional resonant frequency tracking method uses such as a synchronous method using a phase-locked loop (PLL) as disclosed for example in JP-A-62-85684 and a resonant frequency searching method using a digital storage means as disclosed for example in JP-A-63-02774. However, with the former method when noises are high a stable operation can hardly be realized, and further with the later method using the digital technology when a high resolution searching is required the circuit scale is enlarged and complexed as well as the searching time thereby is prolonged.

SUMMARY OF THE INVENTION

The present invention relates to an ultrasonic motor in which the rotor is constituted so as to limit the variation of rotating torque to thereby achieve a stable and high rotating torque with a reduced cost.

The present invention also relates to an ultrasonic motor using a non-metallic rotor having a desirable environmental property being hardly affected by such as electric field and magnetic field as well as hardly affecting others.

The present invention further relates to an ultrasonic motor driving device which is constituted by a simple circuit with a reduced production cost as well as operable at a high speed, a high resolution and a high effeciency.

Additionally the present invention provides a simple and small size voltage adjusting device for a plurality of high voltage focusing potentiometers in a CRT display device.

The benefits of the present invention are achieved by forming a rotor having substantially a cylindrical shape of which inner face is provided with spring means through injection molding so as to contact with a stator which is constituted operable as an ultrasonic vibrating element for an electrostrictive revolution type ultrasonic motor. Further, the former objects are achieved by using as a molding material for the rotor a material having hardness lower than that of the stator material and having a high Young's modulus, for example, a plastic material, more specifically, a material mainly containing such as polycarbonate or acylic resin possibly containing a reinforcing material.

According to an advantage of the present invention, since the rotor is formed by injection molding, the dimentional variation and the processing distortion of the rotor are limited, as a result, the contact pressure of the rotor with respect to the stator can be controlled almost within a predetermined desirable range and a stable rotating torque with a limited variation is obtained.

Further, a plastic material having a comparatively high Young's modulus is used for the injection molded rotor, the productivity thereof is improved as well as the production cost thereof is reduced. Further, since the rotor thus produced is soft in comparison with a hard metallic material, even when the contacting pressure against the contacting face of the stator of a dielectric ceramic material is increased, a stable frictional force is obtained without damaging the contacting face. As a result, the rotating torque as well as the static holding torque of the ultrasonic motor are increased and stabilized. Further, because of no use of metallic material for the rotor, the rotor is not affected by electric field and magnetic field and is applicable in an environment requiring a high resistance to electricty, for example, for a focusing voltage adjusting servo in a flyback circuit for a TV receiver.

The present invention achieves by a driving device for driving at least one ultrasonic motor which comprises an oscillator which generates variable frequencies in response to a variable signals from a computer for finely dividing a predetermined frequency range and causing a successive scanning, a driver which amplifies the oscillation signal from the oscillator and drives the ultrasonic motor, a voltage detecting means which samples and detects a load current for driving the ultrasonic motor for every variable frequency, a comparing means which compares the magnitude between the current detection value and a current value held in a holding means which holds the larger current value determined in the comparing means in a sample hold analogue circuit, wherein the driving frequency for the ultrasonic motor is set where the driving current for the ultrasonic motor maximizes.

Further, in the driving device for driving the ultrasonic motor according to the present invention, the output stage of the driver is constituted by an inverter including a bridge circuit outputting a rectangular pulse voltage and the current detection circuit includes a resistor connected in series at one DC side terminal of the above bridge circuit and detects the load current in a DC amount by means of the above resistor regardless to the driving phase and polarity.

Still further, in the driving device for driving the ultrasonic motor according to the present invention, a plurality of ultrasonic motors are provided and when driving one of the motors after changing-over the respective ultrasonic motors, the arms constituting the above bridge circuit are used as a changing-over means.

Further, the present invention achieves a voltage adjusting device for a high voltage focusing potentiometer in a CRT display device wherein a plurality of potentiometers integrated with and driven by the respective ultrasonic motors are provided and are designed to be driven by a single driving device.

When a set value of the driving frequency for the ultrasonic motor is successively varied, the bridge inverter at the output stage drives the load with the successively set frequencies, the load current corresponding to the respective driving frequencies are detected as DC voltages at the common ground side of the inverter circuit, the detected voltage is compared with a comparison reference which represents the maximum value already stored in the sample hold analogue circuit in the comparator to discriminate the magnitude of the load current at respective frequencies, namely, the setting from the outside and reading-out are performed by making use of digital values, however the internal operation is performed through an analogue operation, thereby a high speed operation as well as a high resolution operation are realized. Further, the bridge circuit is constituted by switching elements operable at a low voltage, because the driving efficiency of the ultrasonic motor is determined based on the effective voltage value applied thereto and a better driving efficiency is achieved by the use of rectangular waveform voltage other than by a sinusoidal waveform voltage.

Further, through the provision of a plurality of ultrasonic motors and the use of the arms constituting the bridge circuit as the changing-over means other than the use of such as a transfer switch when driving one of ultrasonic motors after changing over between the respective ultrasonic motors, a simple and low cost circuit is realized.

Still further, through the voltage adjustment of a plurality of high voltage focusing potentiometers in a CRT display device by a single driving device, a simple and small size adjusting mechanism for the CRT display device is realized.

BRIEF DESCRIPTION OF THE DRAWINGS

FIG. 7A is a cross sectioned front view of one embodiment of ultrasonic motor for driving a potentiometer according to the present invention;

FIG. 7B is a cross sectioned side view of the embodiment illustrated in FIG. 7A;

DETAILED DESCRIPTION

Figure 1A:
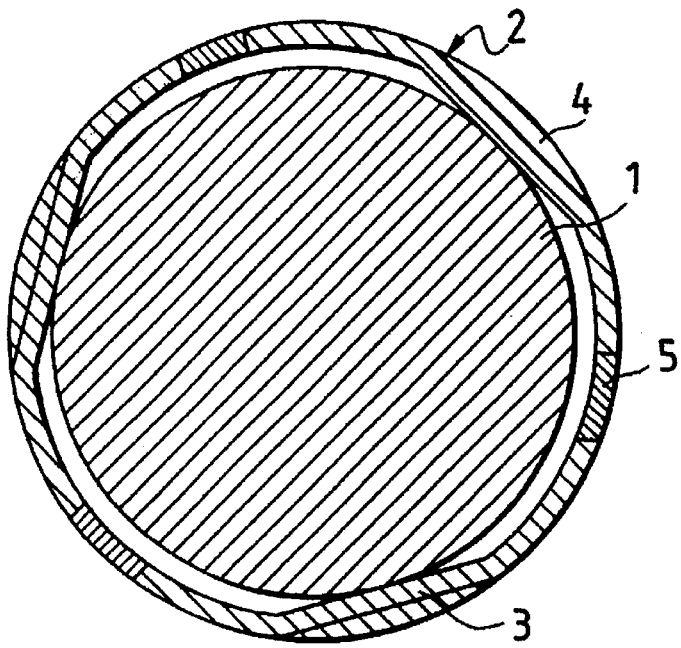
FIG. 1A is a cross sectioned front view of a first embodiment of the ultrasonic motors according to the present invention.
Figure 1B:
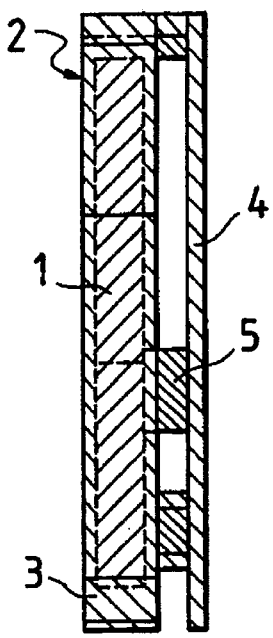
FIG. 1B is a cross sectioned side view of the first embodiment.

FIGS. 1A and 1B show the structure of a first embodiment of the ultrasonic motors according to the present invention. In FIGS.1A and 1B, a cylindrical shaped rotor 2 is assembled with a disk shaped stator 1 of piezoelectric ceramic in such a manner that the rotor 2 contacts the outer circumference of the stator 1. The cylindrical rotor 2 is provided with rotor contacting portions 3 for making contact with the outer circumference of the stator 1 which are formed by linearizing the part of the inner face thereof around the inner face thereof with an equal distance of every 120°. Further, a disk shaped rotor side plate 4 which transmits a rotating torque to an external load (not shown) is attached to the cylindrical shaped ring rotor 2 via side plate supporting portions 5 arranged between the respective contacting portions 3.

Now, the ring rotor 2, the rotor contacting portions 3, the rotor side plate 4 and the side plate supporting portions 5 are formed integrally by making use of a resilient plastic material having a comparatively high Young's modulus and, when required, containing a filler such as polycarbonate or acrylic resin via injection molding.

On the front and back faces of the stator 1 four divided fan shaped electrodes (not shown) are formed by spattering evaporation as explained previously and two phase pulse like voltage having the resonant frequency of the ceramic stator is applied to the respective electrodes via metallic spring wires.

As an exemplary dimension of the first embodiment as illustrated in FIGS. 1A and 1B, the diameter of the stator 1 is 20 mm and the thickness thereof is 1.5 mm, and the cylindrical inner diameter of the rotor 2 is 23 mm, the cylinder portion width thereof is 3 mm and the thickness thereof is 1 mm or slightly larger. Under the condition when the stator 1 is fitted into the rotor 2, the contacting portions 3 of the rotor 2 is flexed by the stator 1 to about 50 µm to thereby generate a holding torque of about 150 gfcm.

For the thus structured ultrasonic motor, when the stator 1 is excited by a two phase pulse like voltage of 5Vp-p having a resonant frequency of about 100 kHz, a portion where the voltage of the same polarity with respect to the polarization is applied is compressed to thereby extend in radial direction and contrary the opposing portion is contracted, as a result, the stator 1 begins a precession of 1 µm or slightly less at the resonant frequency and the precession is transmitted to the rotor 2 located outside via frictional contact to rotate the rotor 2.

Although the rpm of the rotor 2 varies depending on loads, the rpm about 100 is obtained when no load, and a maximum starting torque of about 70 gfcm is also obtained, of which torque amounts more than two times of the maximum torque of the conventional ultrasonic motor of the same size using the phosphor bronze rotor formed by drawing, and with the present rotor 2, the variation of maximum starting torque possibly due to unstable contacting force is greatly reduced. These advantages owe to a limited dimensional variation of less than ±10 µm which amounts ⅓ of the conventional ultrasonic motor as well as to a limited distortion during processing, and further through the use of the plastic ring shaped rotor the damaging of the contacting face of the ceramic stator is prevented which was caused when a hard metal for a spring material was used. Accordingly, even when the contacting pressure is increased the contact friction is stabilized for long time and together with the structure giving a broad contacting area a high and stable torque is obtained with the present embodiment.

Further, the rotor is formed by a comparatively inexpensive material via injection molding, therefore together with the adjustment free production the production cost of the rotor is reduced.

Figure 2A:
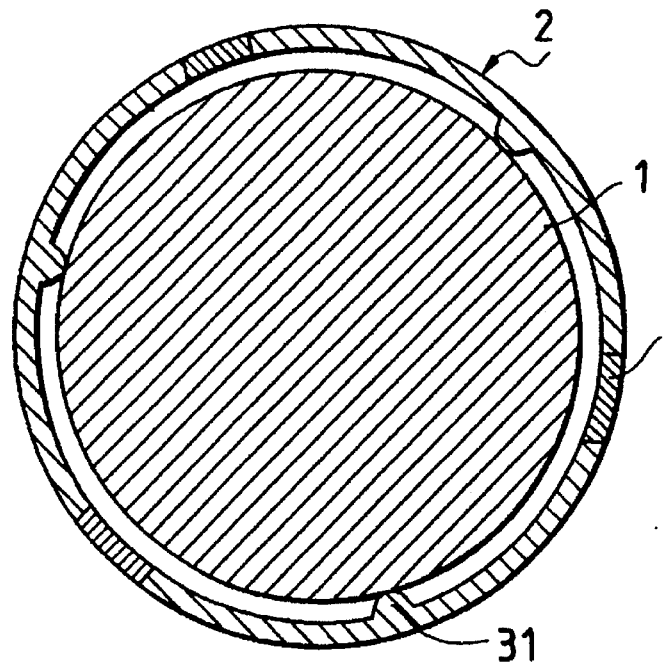
FIG. 2A is a cross sectioned front view of a second embodiment of the ultrasonic motors according to the present invention.
Figure 2B:
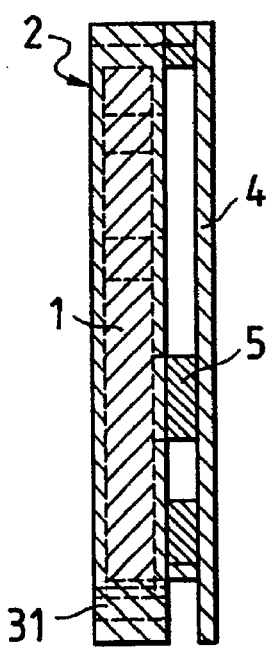
FIG. 2B is a cross sectioned side view of the second embodiment.

FIGS. 2A and 2B show a second embodiment of the ultrasonic motors according to the present invention. The same or equivalent portions in FIGS. 2A and 2B as in FIGS. 1A and 1B are designated by the same reference numerals as in FIGS. 1A and 1B.

The ultrasonic motor of FIGS. 2A and 2B is constituted by a stator 1 of piezoelectric ceramic, a ring rotor 2 contacting the outer circumference of the stator 1, projecting portions 31 formed on the rotor, a rotor side plate 4 and side plate supporting portions 5. The projecting portions 31, the rotor side plate 4 and the side plate supporting portions 5 are made of the same material as the rotor 2 and are formed integrally at the same time with the rotor 2 via injection molding.

Further, such as electrode structure on the stator 1 is the same as those already explained in connection with FIGS. 9A and 9B and FIGS. 1A and 1B. Further, the rotor 2 is rotated in the same manner as explained above, in that, by causing the precession on the stator 1 through application thereto of a two phase pulse like voltage of a high frequency as the fundamental operation thereof.

In FIGS. 2A and 2B embodiment, the contact between the rotor 2 and the stator 1 is performed by projecting portions of easily produced simple shape, thereby the maximum diameter of the rotor 2 is slightly reduced. However, the torque variation due to friction change of the contacting portions depending on time slightly increases in comparison with the rotor structure as illustrated in FIGS. 1A and 1B.

Figure 3A:
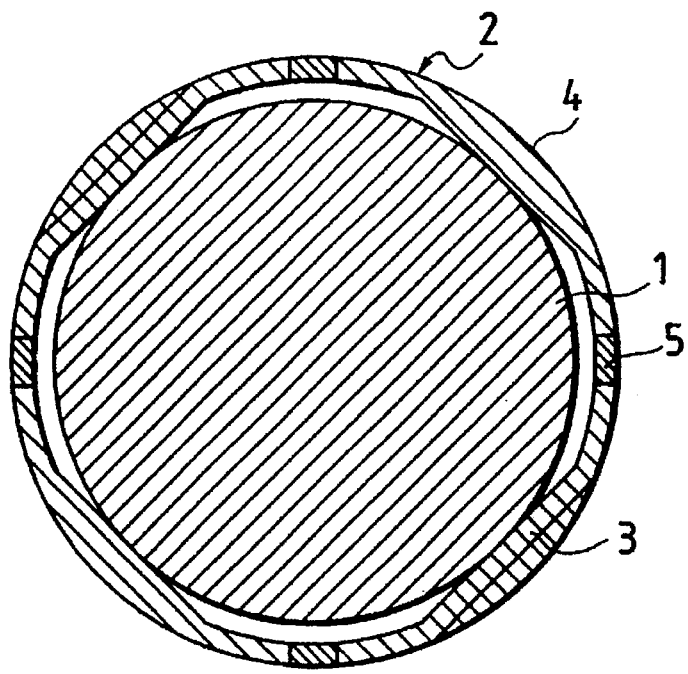
FIG. 3A is a cross sectioned front view of a third embodiment of the ultrasonic motors according to the present invention.
Figure 3B:
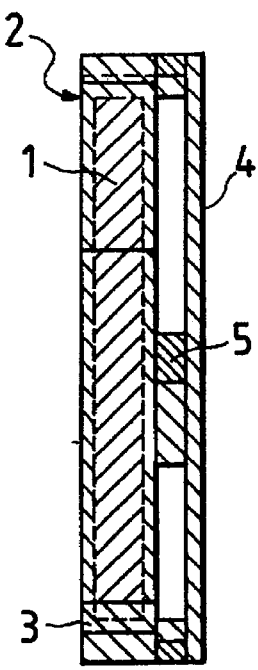
FIG. 3B is a cross sectioned side view of the third embodiment.

FIGS. 3A and 3B show the third embodiment of the ultrasonic motors according to the present invention. The rotor 2 in FIGS. 3A and 3B embodiment is provided with rotor contacting portions at more portions of four than the previous embodiments. For this reason, with the ultrasonic motor of FIGS. 3A and 3B structure the rotating torque due to increase of the contact friction force transmission is slightly increased.

In the ultrasonic motor, the rotating torque is induced by the contact friction, therefore it is assumed on one hand that when the number of the portions for the contact friction is increased the rotating torque is correspondingly increased, however on the other hand when the number of the portions for the contact friction is increased it becomes difficult to keep the contacting pressure at respective contacting points uniform because of their dimensional variation, in particular, increase of out of roundness and the non-uniformity of the contact pressure cause irregular rotation. Accordingly, the number of contacting portions on the rotor is preferably to be three or four and at most about six.

Figure 4A:
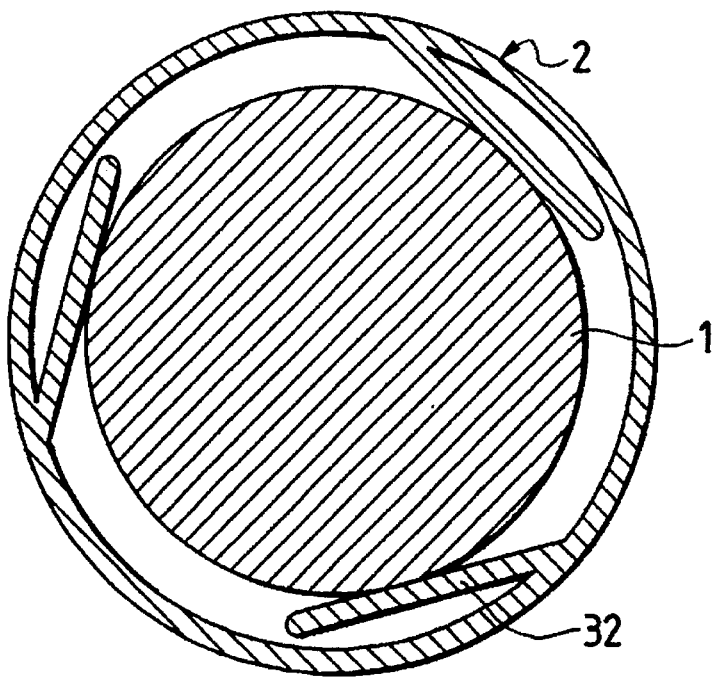
FIG. 4A is a cross sectioned front view of a fourth embodiment of the ultrasonic motors according to the present invention.
Figure 4B:
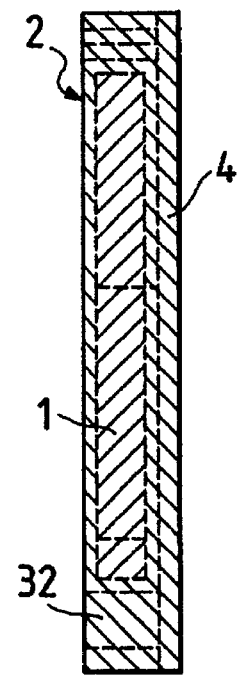
FIG. 4B is a cross sectioned side view of the fourth embodiment.

FIGS. 4A and 4B show the fourth embodiment of the ultrasonic motors according to the present invention. In FIGS. 4A and 4B embodiment, the ring shaped rotor 2 arranged around the outer circumference of the stator functioning as an ultrasonic vibrating element is provided with cantilevers 32 contacting the stator 1. Further, the side plate 4 for the rotor 2 is integrated with the ring shaped rotor 2 without clearances different from the previous embodiments.

Figure 8:
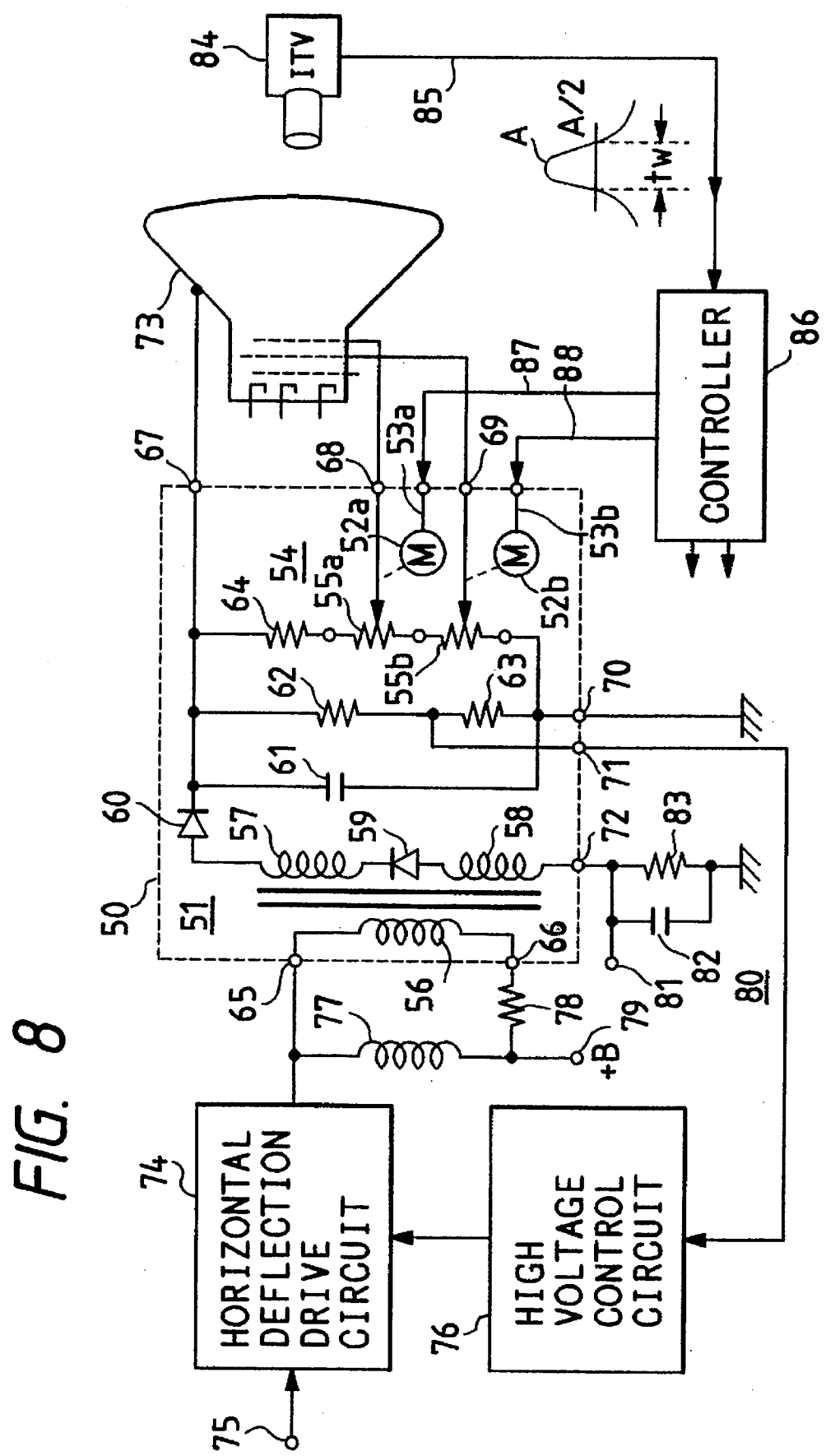
FIG. 8 is a circuit diagram for automatic focusing adjustment in a CRT display device according to the present invention.
Figure 9A:
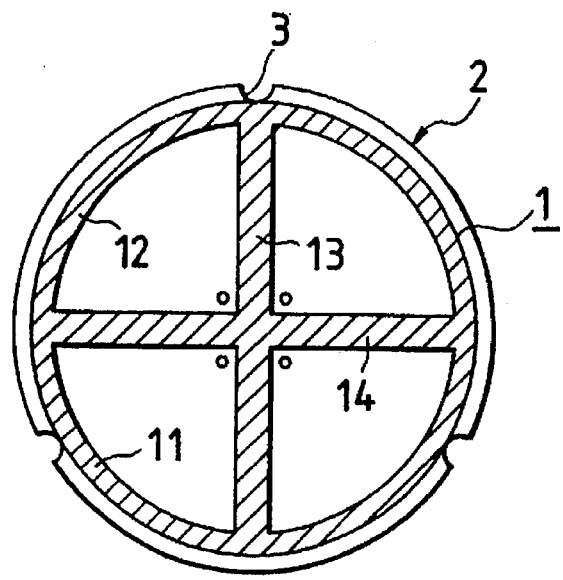
FIG. 9A is a cross sectioned front view of a conventional ultrasonic motor.
Figure 9B:
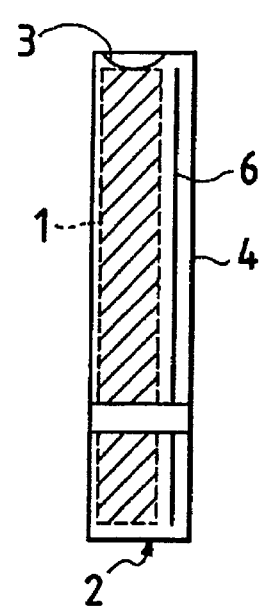
FIG. 9B is a cross sectioned side view of the conventional ultrasonic motor as illustrated in FIG. 9A.

With the present embodiment, although the ring portion of the rotor 2 is restricted by the side plate 4 to prevent flexing, through the flexing of the cantilever portions 32 a stable frictional contact can be obtained between the rotor 2 and the stator 1, therefore, the ring portion of the rotor 2 can be integrated with the side plate 4 without clearances. Accordingly, a large creeping distance between the stator side and the load side, in that the outside of the rotor side plate, corresponding to the eliminated clearances, is obtained, thus the present embodiment is suitable for driving a load of a high voltage. One of the application which can make use of the above advantage in maximum is a servo motor used for a high focusing voltage adjustment in a CRT display device of which application is illustrated in FIG. 8 and will be explained later in detail. In the present embodiment, all of the contacting pressure in the plastic rotor is provided via the cantilever portion, the spring function due to flexing of the ring portion can be eliminated.

Figure 5A:
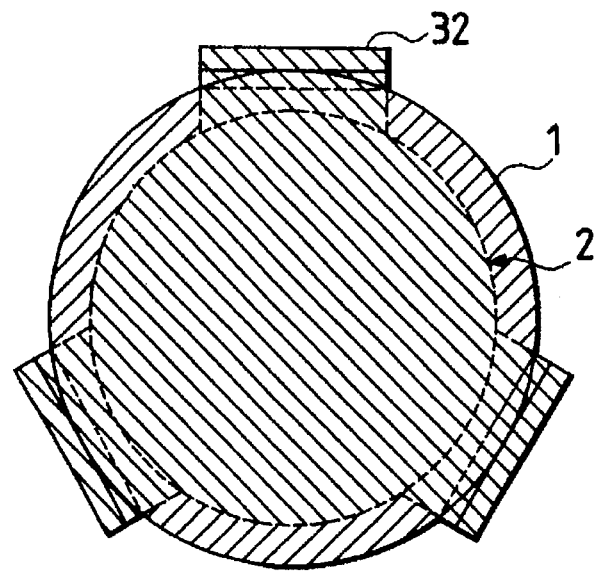
FIG. 5A is a cross sectioned front view of a fifth embodiment of the ultrasonic motors according to the present invention.
Figure 5B:
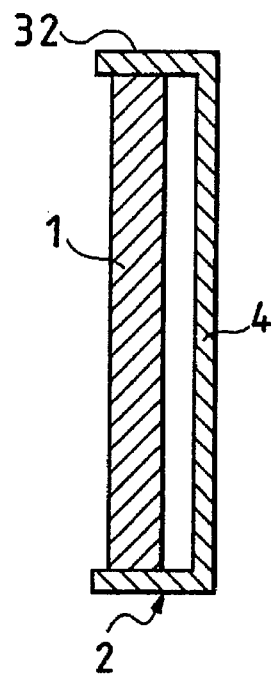
FIG. 5B is a cross sectioned side view of the fifth embodiment.

FIGS. 5A and 5B show the fifth embodiment of the ultrasonic motors according to the present invention. In FIGS. 5A and 5B, the ultrasonic motor is constituted by a stator 1 and a rotor 2 in which a rotor side plate 4 and contacting portions 32 are formed integrally. The contacting portions 32 function as a cantilever to provide the contacting pressure to the stator 1.

In FIGS. 5A and 5B embodiment the ring portion of the rotor 2 is eliminated, the weight of the rotor 2 is reduced and correspondingly thereto the inertia of the rotor 2 is reduced, thereby the response time for starting and stopping the motor is speeded-up to about 10~20 ms as well as the production cost thereof is reduced because of the simple structure.

However, with FIGS. 5A and 5B embodiment since the effective length of the cantilevers is short, the relative thickness of the stator 1 can not be neglected and the contacting pressure on the stator can not be treated equal in its thickness direction, an optimum design for the frictional force as well as the holding torque is somewhat difficult. For this reason an modification for elongating the effective length of the cantilevers is explained in the following.

Figure 6A:
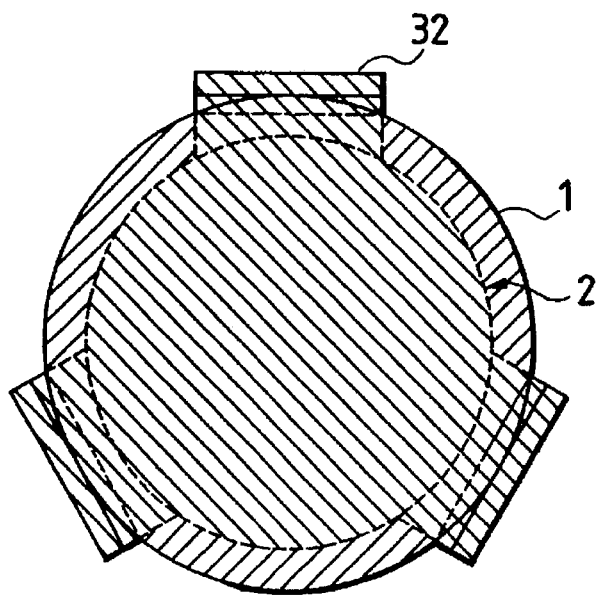
FIG. 6A is a cross sectioned front view of a sixth embodiment of the ultrasonic motors according to the present invention.
Figure 6B:
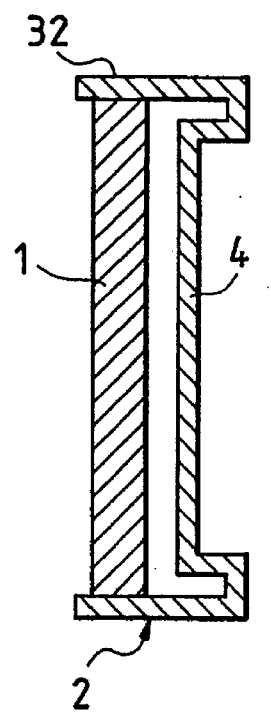
FIG. 6B is a cross sectioned side view of the sixth embodiment.

FIGS. 6A and 6B show the sixth embodiment of the ultrasonic motors according to the present invention. In FIGS. 6A and 6B embodiment, the cantilever type contacting portions 32 of the rotor 2 contacting the stator 1 are formed in lateral U shape, thereby the effective length of the cantilever is set sufficiently long with respect to the thickness of the stator 1, and with the elongated cantilevers a uniform contacting pressure is obtained in the thickness direction of the stator 1.

In the embodiments explained hereinabove, the contacting pressure to the stator 1 from the rotor 2 is maintained by the rigidity of the rotor itself, however, in addition to the rigidity of the rotor another force can be used for maintaining the contacting pressure, the following is such an embodiment.

FIGS. 7A and 7B show the seventh embodiment of the ultrasonic motors according to the present invention. The features of FIGS. 7A and 7B embodiment are that as seen from the front view in FIG. 7A a ring shaped rotor 2 contacts disk shaped stator 1 of piezoelectric element via linearized portions 3, and as seen from the side view in FIG. 7B both the stator 1 and the rotor 2 are provided with inclined contacting faces.

The structure of the present embodiment is explained with reference to the side view as illustrated in FIG. 7B. The electrode face of the stator 1 is led via metal coils 10 serving for supplying power as well as holding the same and a terminal plate 21 and along a holding box 22 to a power supply conductor 23 on a substrate 7. On the other hand, a side plate 4 with a manual rotation use shaft 41 for transmitting a rotating torque to a load is fitted to the rotor 2 and to the side plate 4 a metallic lever type brush 9 for a potentiometer constituting the load is attached. The ends of the brush 9 is contacted to a resistance pattern 8 for the potentiometer and a common conductor pattern 91 for current collection formed in advance on the substrate 7 through thick film printing.

The ultrasonic motor having the structure as explained with reference to FIGS. 7A and 7B operates as follows. When a high frequency voltgae is applied to the stator 1 via the power supply conductor 23, the revolving vibration of the stator 1 is transmitted to the rotor 2 in a form of rotating torque via the conical shaped contacting face to rotate the rotor 2 as well as the side plate 4. Accordingly, the brush 9 for the potentiometer is rotated so that a small sized motor driven potentiometer is realized which permits an accurate operation.

In FIGS. 7A and 7B embodiment the contacting pressure at the contacting face between the stator 1 and the rotor 2 is adjustable not only by the rigidity of the rotor 2 but also primarily by the thrust due to the metallic coils 10 at the stator side and the brush 9 for the potentiometer at the load side, accordingly materials for the rotor 2 having a variety of rigidities can be selected, thereby the design freedom therefor is increased. Further, another advantage of the present embodiment is that since the thrust from the load side is held at the contacting face a thrust bearing otherwise required is eliminated for a load requiring a thrust.

A conventional example wherein the contacting face between the stator and rotor is inclined and the thrust bearing is eliminated is disclosed in JP-A-63-181677 which partly corresponds to U.S. Pat. No. 4,868,446. However, in the conventional example the stator and the rotor are designed to contact through all the circumference thereof, therefor both the stator and the rotor are required to be finished with a high degree of roundness and smoothness, for example both at about ± a few μm allowance, therefore the conventional ultrasonic motor had drawbacks with regard to productivity and durability thereof. On the other hand, in FIGS. 7A and 7B embodiment the stator and the rotor contact only at three point other than all the circumferential faces thereof, the requirement with regard to roundness and smoothness is greatly relaxed.

In the above embodiments of the ultrasonic motors according to the present invention several rotors formed by injection molding are explained, however the shapes of the rotors are not limited those explained with reference to the embodiments and can be modified according to the general concept of the present invention. The same can be said to plastic materials to be used for the rotor.

Usually several types of reinforcing materials or fillers can be properly mixed in the plastic material for the rotor depending on requirements for the rotor. For example, in order to improve elasticity or Young's modulus for the purpose of reducing the size of the rotor, oxide particles such as silica and alumina, carbide particles such as calcium carbonate and silicate particles such as glass can be used. Further, as will be explained in the following application example when the ultrasonic motor serving as a servo motor for a high voltage focusing adjustment is integrated with a high voltage flyback circuit portion, the plastic rotor is required to have a fire resistant and an improved temperature characteristic, in other words a reduced linear expansion coefficient, therefore for fulfilling the former property hydroxides such as magnesium hydroxide and aluminum hydroxide, and for fulfilling the later property oxides such as calcium carbonate and silicates such as glass are mixed. Further, in order to increase durability it is effective to coat the frictional contacting face at the rotor side with a paint containing fillers having a high abrasion resistance at least upto a few μm thick.

Now, one of typical application example of the ultrasonic motors according to the present invention is explained in the following.

FIG. 8 shows an application example wherein the present invention is applied for a focusing voltage adjustment and a screen voltage adjustment in a CRT display device. In FIG. 8, a high voltage generating circuit 50 is constituted by a flyback transformer 51, an automatic adjusting device 54 and others, and elements thereof except for movable elements are integrally molded with a resin so as not to expose the high voltage portions. A primary winding 56 of the flyback transformer 51 is connected in parallel with a horizontal deflection coil 77 via a resistor 78 and is driven by +B power source supplied to a terminal 79 and a horizontal deflection driving circuit 74, more specifically driven by a pulse voltage generated during its flyback line period. Further, a horizontal synchronous pulse is inputted to a terminal 75.

On the other hand, the output of secondary windings 57 and 58 of the flyback transformer 51 is rectified by rectfying diodes 59 and 60, smoothed by a capacitor 61 and supplied as the anode voltage for a CRT 73 via a high voltage output terminal 67. An example of the anode voltage is in a range about 25 KV through 30 KV. The other terminal of the secondary winding 58 of the flyback transformer 51 is grounded via another current detecting circuit 80 constituted by a resistor 83 and a capacitor 82.

The anode output voltage of the flyback transformer 51 is detected via a voltage dividing circuit constituted by a high resistance resistors 62 and 63 and the pulse voltage of the horizontal deflection driving circuit 74 is controlled via the high voltage control circuit 76 so that the anode voltage is kept at a constant value.

The high voltage to the anode output terminal 67 is divided by a high resistance resistor 64 and the automatic adjusting device 54 constituted by potentio-meters 55a and 55b having a high resistance value and their associating ultrasonic motors 52a and 52b, and the divided output is applied from a determinal 68 to the focusing electrode of the CRT 73 (in a high precision use CRT display device and a large scale TV two focusing electrodes are usually provided, however in FIG. 8 embodiment only one focusing electrode is illustrated for the sake of simplifying the drawing). In the like manner, another divided output voltage is applied from a terminal 69 to the screen electrode of the CRT 73. These required divided voltages are usually in a range of 6~8 KV for the focusing electrode and in a range of 500~800 V for the screen electrode.

The resistance value of the potentiometer 55a for adjusting the focusing voltage is from a few MΩ to 10 MΩ. The potentiometer 55a and the associating ultrasonic motor 52a for driving the same are mechanically integrated and the small electrostrictive revolution type ultrasonic motor according to the present invention, which is suitable to form integrally together with the flyback transformer and is comparatively less affected by electromagnetism, is used for the potentiometer driving motor.

At the tube face side of the CRT 73 industrial scale image pickup device (ITV) 84 including an optical magnifying lens series and a light receiving sensor is arranged of which output 85 is connected to a controller 86 incorporating a microcomputer. Driving outputs 87 and 88 from the controller 86 are respectively connected to an input line 53a of the ultrasonic motor 52a for focus voltage adjustment and an input line 53b of the ultrasonic motor 52b for screen voltage adjustment.

In FIG. 8 circuit thus constituted, when a synchronous input is applied to the synchronous input terminal 75, the horizontal deflection driving circuit 74 drives the deflection coil 77 as well as the primary coil 56 of the flyback transformer 51 and generates a voltage of about 30 KV at the anode output terminal 67 at the secondary side of the flyback transformer 51. The generated voltage is detected by the voltage driving circuit constituted by the high resistance resistors 62 and 63 and is fedback to the high voltage control circuit 76 so as to maintain the same at a constant voltage and to enable display at the CRT 73.

After reaching the above condition, the automatic focusing adjustment in FIG. 8 circuit is performed in the following way. At first, at a position on the tube face of the CRT 73 of which focus is to be adjusted a cross hatch or cross pattern (not shown) of the most fine segment is indicated, the cross hatch at the portion where the focusing adjustment is to be performed is focused by the image pickup device 84 and the cross hatch segment is converted into an electrical signal having a time width corresponding to the line width as illustrated in FIG. 8. Namely, the waveform illustrated in FIG. 8 is an electrical signal output when a cross hatch segment is scanned with the image pickup device 84, wherein the line width or boldness is defined by the scanning time width Tw at the half magnitude A/2. In other words, a count value W, which is obtained by counting tw with a counter operating on a predetermined clock, is used as focusing information, and the focusing voltage is adjusted so as to minimized the value W of which condition is assumed as the best focus.

The control and the condition judgement in the above focusing operation are performed by the controller 86 as illustrated in FIG. 8 which makes use of a microcomputer. Namely, a stepping drive voltage from the output 87 of the controller 86 is applied to the ultrasonic motor 52a of the automatic adjusting device 54, thereby the divided voltage of the focusing use potentiometer 55a is finely adjusted so as to minimize the signal Tw relating to the line width.

In the like manner, for the screen voltage adjustment, the brightness of the tube face is measured with the image pickup device (ITV) 84 and the screen use potentiometer 55b is driven so that the brightness reaches to a predetermined level.

In the automatic adjusting system of the focusing voltage and the screen voltage as illustrated in FIG. 8, the automatic adjusting device 54 as illustrated as a function of a motor driven potentiometer is in particular important in connection with the adjustment accuracy and reliability.

For the adjustment accuracy of the focusing and screen voltage, about 1% of the output voltage is required, thereby it is appropriate to select about ¼ (0.25%) of the required % output voltage as an adjustment interval for one step. Further, it is desirable that the automatic adjusting device 54 is operable when molded integrally together with the flyback transformer in view of the reliable operation thereof. Accordingly, it is desirable for the motor for driving the automatic adjusting device to satisfy the following conditions.

(1) The motor can operate under an intense magnetic field without any troubles.
(2) The heat generation of the motor in a steady condition is low.
(3) The motor shows stepping property of a microscopic angle level and a large static torque.

For fulfilling the above conditions, in the present application example one of the ultrasonic motors according to the present invention as explained in detail in connection with FIGS. 1A, 1B, 2A, 2B, 3A, 3B, 4A, 4B, 5A, 5B, 6A, 6B, 7A and 7B embodiments is used for the potentiometer driving use motor.

In the application example in FIG. 8, an example wherein the potentiometer and the ultrasonic motor are in advance integrated and then accommodated in the flyback circuit box at the high voltage side is illustrated, however, as an alternative only the potentiometer can be accommodated in the high voltage side box while exposing the shaft of the potentiometer to the outside and thereafter the ultrasonic motor can be fitted to the outside shaft to permit the driving thereof. In such installation although the load torque is increased due to the rotating mechanism for the shaft, the potentiometer at the high voltage side is isolated from the ultrasonic motor at the low voltage side by the box, thereby the structure is not limited by the other wise required insulation distance.

According to one aspect of the present invention, through the use of a rotor produced via injection molding as the rotor for a electrostrictive revolution type ultrasonic motor, an ultrasonic motor of a reduced cost with a limited contacting pressure variation and a high stable torque is realized. Further, through the use of a plastic material having a high Young's modulus as the rotor material the above advantages are further enhanced. Still further, through the use of the plastic rotor, the adverse effect by magnetic field and electric field to the ultrasonic motor is minimized and the application thereof under an intense magnetic field as well as an intense electric field is enabled.

Figure 10:
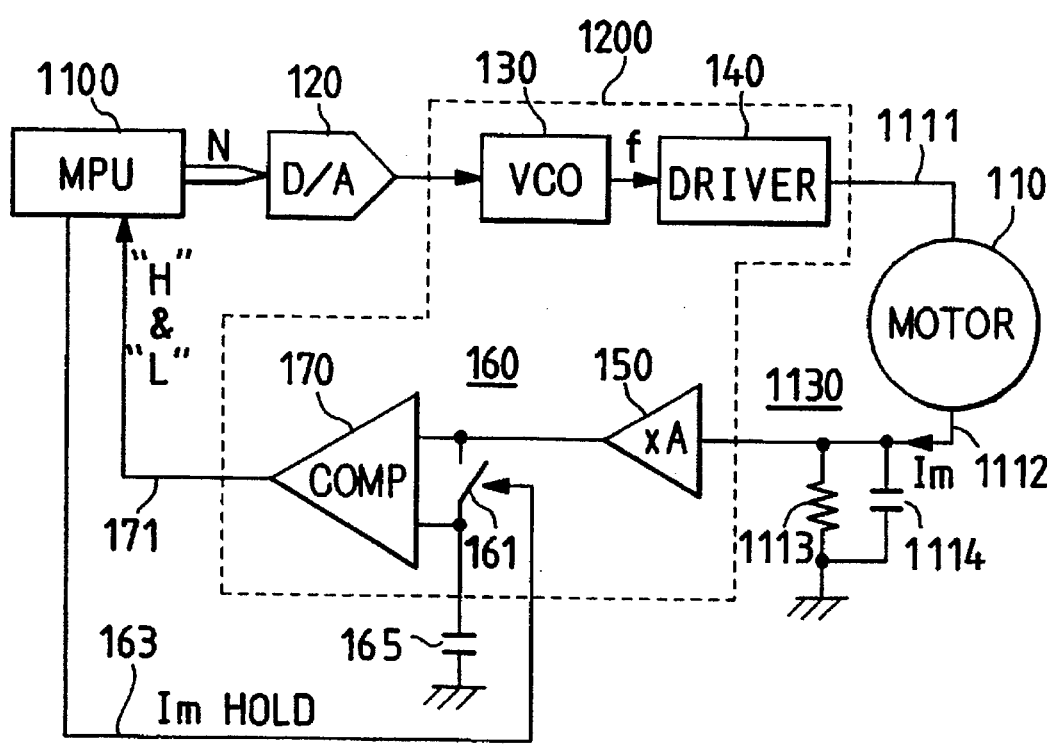
FIG. 10 is a block diagram of one embodiment of driving circuits for an ultrasonic motor according to the present invention.

FIG. 10 shows one embodiment of driving devices for an ultrasonic motor according to the present invention. In FIG. 10 circuit, an ultrasonic motor 110 is connected in the circuit so that the driving voltage therefor is applied from an integrated motor drive control circuit 1200 via terminals 1111 and 1112. The motor drive control circuit 1200 is constituted by a driver 140 for the motor, a voltage controlled oscillator (VCO) or a variable frequency oscillator 130 connected at the input side of the driver 140, a preamplifier 150 which amplifies a signal voltage from a CR filter 1130 mounted outside the integrated circuit for detecting motor current, a sample hold circuit 160 and a voltage comparator 170. The driving device for the ultrasonic motor 110 further includes a microprocessor or a microcomputer 1100 performing over all control therefor and a digital/ analogue (D/A) converter 120 of which input is set by the microprocessor 1100 and which varies the output frequency of the VCO 130. In this circuit the resolution of about 8 bits is usually sufficient for the D/A converter 120.

Figure 11:
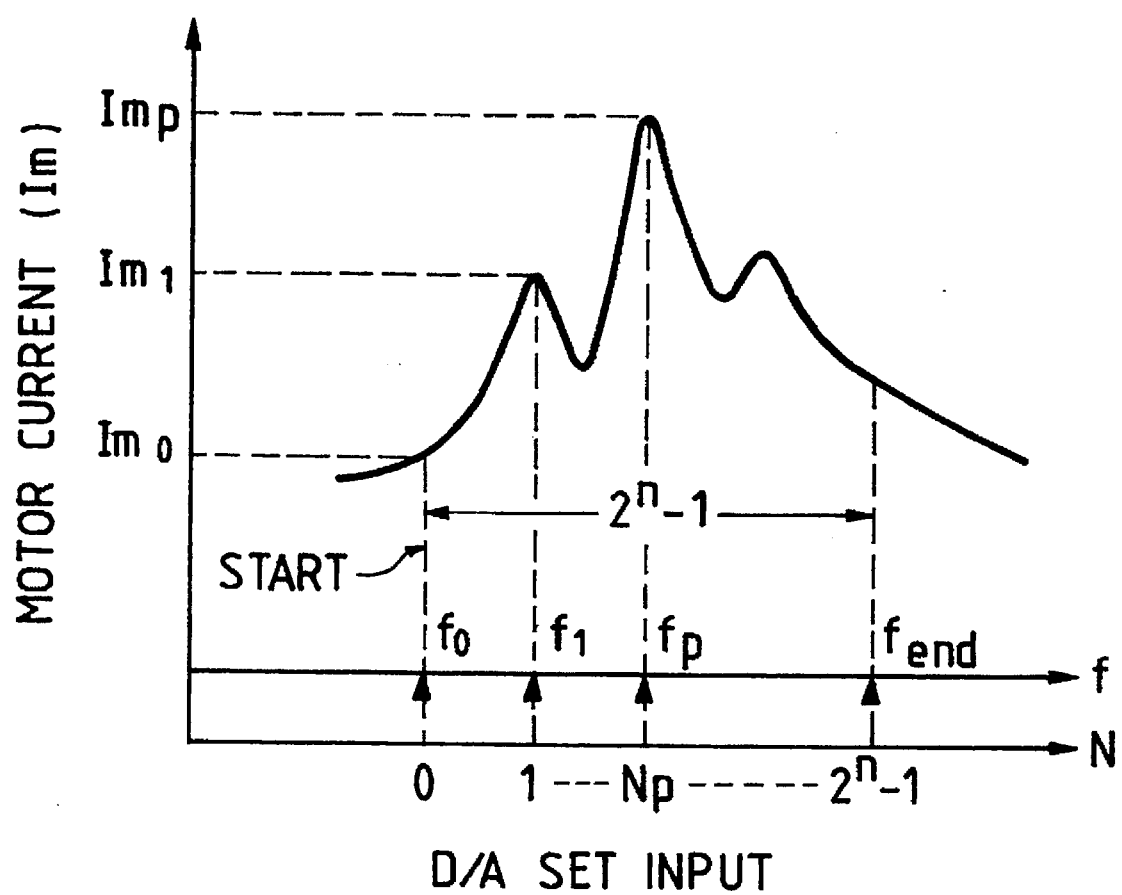
FIG. 11 is an operation characteristic diagram of the embodiment as illustrated in FIG. 10.

Before explaining frequency tracking operation in FIG. 10 circuit with reference to the characteristic diagram as illustrated in FIG. 11, the characteristic of the object ultrasonic motor is briefly explained with reference to FIG. 11. FIG. 11 shows an exemplary characteristic of avarage motor current with respect to driving frequency for the ultrasonic motor at abscissa. The point of the largest motor current corresponds to a true resonant point representing the frequency at which the maximum torque is generated.

The frequency tracking operation in FIG. 10 device is explained with reference to FIG. 11. The frequency searching operation is usually performed in a range of ±2.5% from the resonant frequency. The frequency searching operation is basically performed in the direction from a high frequency to a lower frequency, however, in FIG.11 the operation from a lower frequency to a higher frequency is explained for the sake of explanation convenience.

At first, the output of the D/A converter 120 is rendered to 0 by the microprocessor 1100 and the output frequency of the VCO 130 is set at an initial value f0 as illustrated in FIG. 11. At this moment the magnitude of current Im flowing into the motor 110 via the driver 140 is Im0 as seen from the characteristic diagram of FIG. 11. This current is smoothed via the current detection CR filter 1130, amplified in the preamplifier 150 and inputted in the sample hold circuit 160. The motor current for the initial value from the microprocessor 1100 turns on a switch 161 via a signal line 163 holding Im, is stored as an initial value in a hold capacitor 165 in the sample hold circuit 160 and is used as a reference value for comparing with a current value in the next step thereby to perform the searching sequence via the comparator 170. The followings are the series of searching sequence operation including the above explained operation.

(1) An initial data 0 is set at the D/A converter 120 and the motor current Im0 is held.
(2) Subsequently, data 1 is set and the corresponding motor current value Im1 is compared with the initial motor current value Im0.

When Im1<Im0, the data 1 is inputted into a memory and Im1 is held.

When Im1>Im0, no operation is performed but simply moves to the next step.

(3) Then, the data of the next step is set, the like comparison and judgement are performed and such operation is repeated until $2^{n-1}$th step, as a result only Np remains in the memory.
(4) The D/A converter is set by the data Np stored in the memory to complete the searching sequence.

Under the condition of above (4), the driving frequency for the ultrasonic motor has been tracked to the value equal to the resonant frequency, thereby the circuit can move to a primary motor control operation. In FIG. 10 circuit the time required for the frequency searching is substantially determined by the time constant of the smoothing filter for the motor current detection. When assuming that the time constant of the filter at the resonant frequency of 100 kHz is 40 µs and the total sequential operating time of the microprocessor, 8bit D/A converter, the amplifier, the comparator etc. is 5 µs, the searching time Ts is expressed as follows.

$$Ts=45 \text{ µs} \times 256(\text{steps})=11.52 \text{ ms}$$

The above searching time is fully acceptable value.

Further, the resolution $\Delta f$ of the frequency is expressed as follows.

$$\Delta f=100 \text{ kHz} \times 0.05/256 \doteq 20 \text{ Hz}$$

The above value corresponds to less than 0.02% of the center frequency which is a sufficient resolution.

Although the frequency tracking operation as explained with reference to FIG. 10 and FIG. 11 is a searching operation of a resonant frequency, it is important that no frequency values themselves are measured and stored, through which feature the circuit structure of digital portions is simplified and the operation speed therethrough is increased.

The frequency tracking operation is principally performed every time prior to the primary load control. Therefore, even if the time required for the frequency tracking operation is short, such operation time is added to the prior part of the primary rotation angle control and constitutes a sort of loss time. Further, it is undesirable that the motor is subjected to rotation causing disturbance during the tracking operation which may change a set value in the load control. Therefore, the importance of the speeding-up measure according to the present invention increases for both the purposes of reducing the loss time and realizing a high tracking speed which exceeds the inertia of the motor. However, because of a sufficiently high speed response of the servo system when the motor rotation responds to the frequency tracking operation, it is useful to perform the frequency tracking operation under a condition where the supply voltage to the motor is reduced below the rated voltage so that the motor does not begin to rotate. Such an operation can easily realized by isolating the power source terminal of a motor driver stage. Further, through the isolation of the power source terminal of the motor driver stage the current flowing through the terminal is limited to the motor current, thereby the detection sensitivity of the motor current is increased. An example of such isolation terminal is illustrated in FIG. 12 as terminals 1408 and 1409 for GND2.

In the frequency tracking operation according to the present invention, the constitution of the motor drive control circuit of FIG. 10 embodiment is important.

Figure 12:
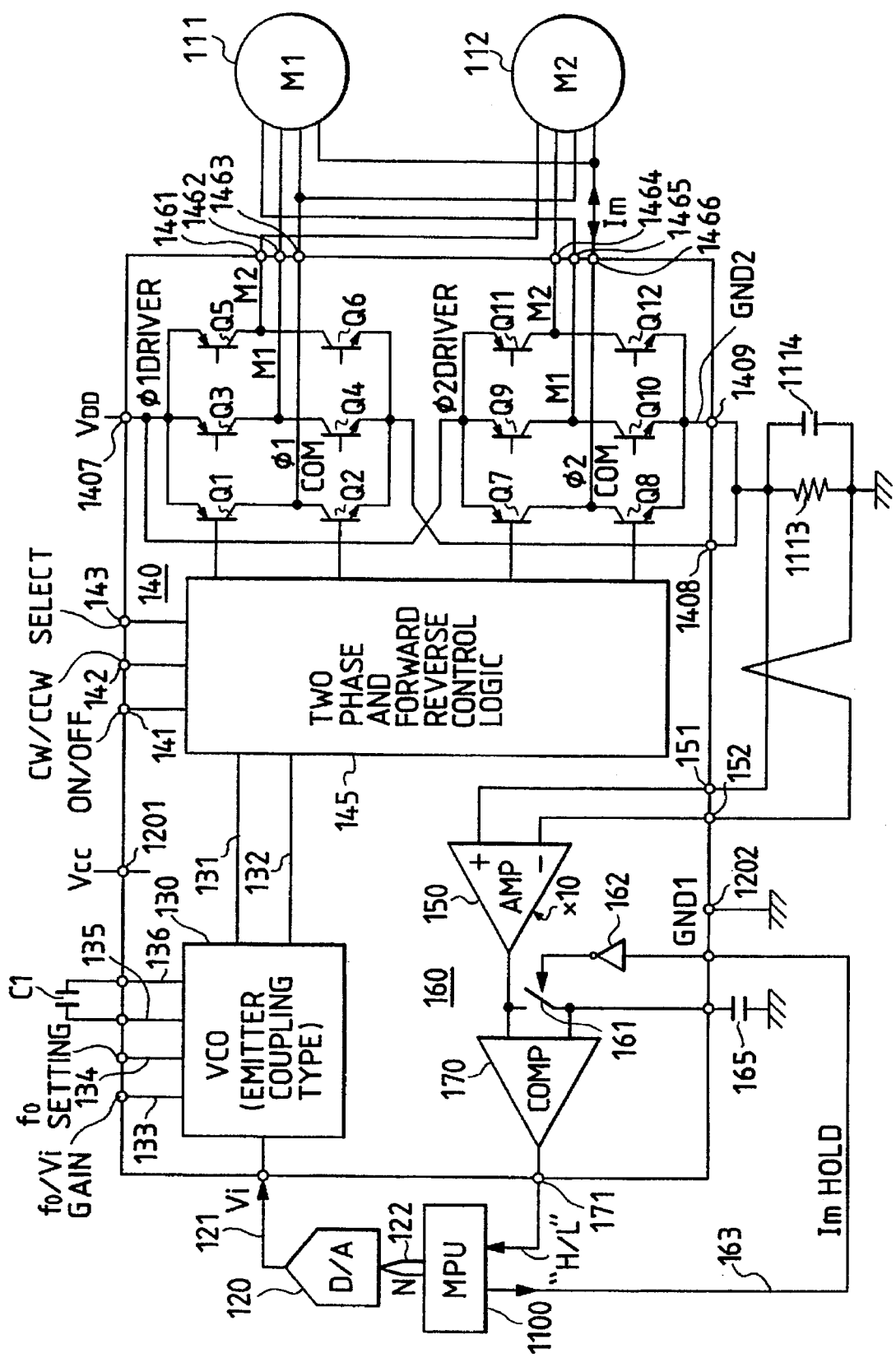
FIG. 12 is a detailed IC circuit block diagram of the embodiment as illustrated in FIG. 10.

FIG. 12 shows a further detailed embodiment of the motor drive control circuit portion. FIG. 12 embodiment shows an example wherein two of two phase ultrasonic motors (M1, M2) are driven. The frequency tracking operation is performed for respective ultrasonic motors M1 and M2. A two phase ultrasonic motor is desirable for a small size servo system because of its improved starting torque and controlability. In FIG. 12, two flat shaped small ultrasonic motor are integrated with two focusing voltage adjusting Potentiometers for a CRT display device and are used for automatic focusing adjustment.

In FIG. 12 embodiment, the driving circuit 140 is constituted by transistors Q1~Q12 serving as an output stage driver and a control logic circuit 145 therefor. The output stage transistors are constituted in bridge circuits and 2 phase bridges of a $\phi$1 driver and $\phi$2 driver which lags from the $\phi$1 driver by 90° are provided for the respective ultrasonic motors M1 and M2. The selection of one of the ultrasonic motors M1 and M2 with these bridge circuits reduces the number of series switches in comparison with a selection performed via conventional transfer switches to thereby improve the use rate of the power source voltage and to allow a low voltage operation. Further, in order to simplify the output bridge circuit, the portions which permit common arms in both $\phi$1 and $\phi$2 drivers for the ultrasonic motors M1 and M2, such as the transistors Q1~Q2 and Q7~Q8 are used in common, thereby the number of output transistors is reduced.

Another advantage of FIG. 12 bridge circuit constitution is a desirable driving efficiency of the load. Namely, when assuming that the power source voltage is VDD and the switch voltage drop loss VSW, a voltage of ±(VDD−2VSW) can be applied to FIG. 12 bridge circuit, thereby the output voltage effective value is increased even though a single porality power source is used.

Still another advantage of FIG. 12 driving circuit is an easy load current detection. The current flowing through a low resistance resistor 1113 for the load current detection provided at the ground side of the bridge circuit is always one way DC current regardless to the phase and polarity of the motor current, thereby the detection thereof is facilitated. Accordingly, a simple smoothing circuit can be used and the magnitude of the terminal voltage at the resistor 1113 can be discriminated in a high speed via the amplifier 150 and the comparator 170.

In FIG. 12 embodiment, an example wherein two ultrasonic motors are driven is explained, however, substantially the same is applied to a case where more than three ultrasonic motors are driven. Since the driving device is applied for driving a plurality of ultrasonic motors, the present invention can be used in many applications which require a plurality of adjustments with the ultrasonic motors such as film rolling-up and auto focusing operations in a camera, mirror adjustment in automobile and an angle adjustment for a directional microphone and speaker in addition to the auto focusing adjustment in a CRT display device.

The control logic circuit 145 comprises an on/off terminal 141 for the motors, CW/CCW terminal 142 for forward and reverse control and a selector terminal 143 for the ultrasonic motors and includes control functions corresponding to the above terminals and functions such as for two phasing logic and for a dead time control of short circuiting prevention during output transistor switching, and with these control terminals having respective functions a variety of output controls can be performed.

Figure 13:
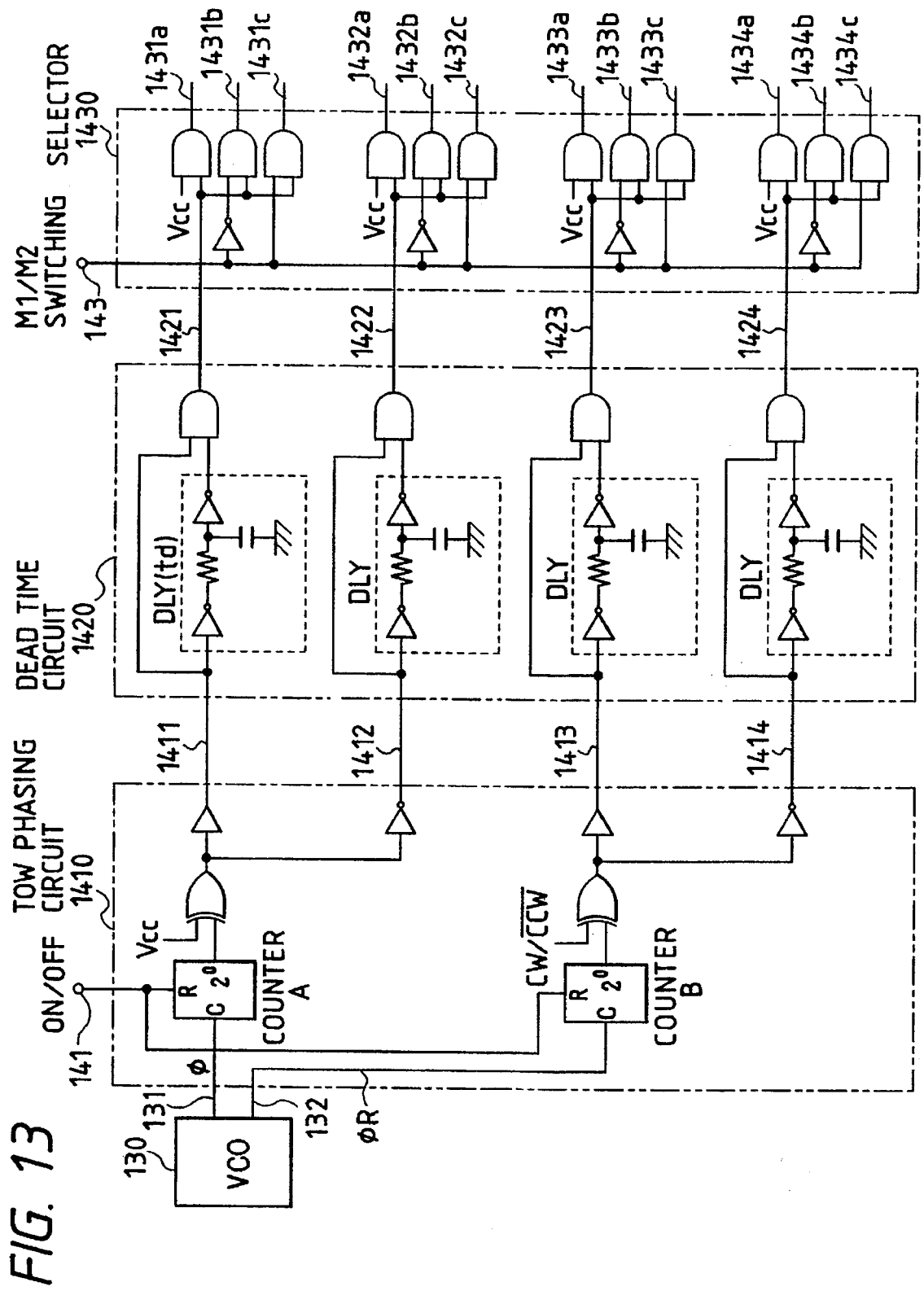
FIG. 13 is a further detailed circuit diagram of one part of the block diagram as illustrated in FIG. 12.

FIG. 13 shows details of the circuit. Namely, FIG. 13 shows a two phasing circuit 1410, a dead time circuit 1420 and a selector circuit 1430 for switching the ultrasonic motors M1 and M2, the downstream side thereof is illustrated in FIG. 14 circuit which is constituted by an on/off control circuit 1440, an output transistor driving use driver 1450, an output stage 1460 and etc.

Figure 14:
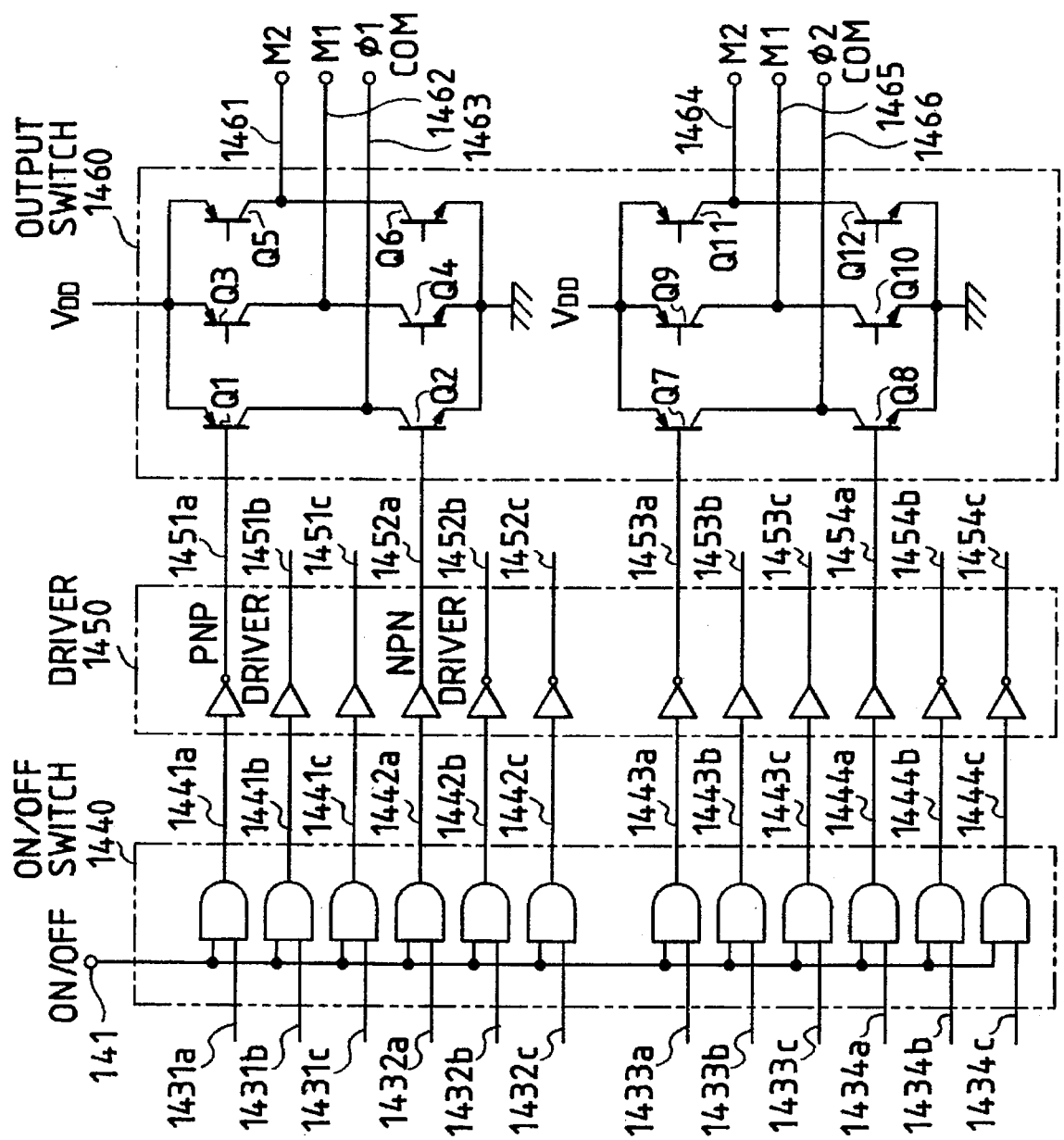
FIG. 14 is a further detailed circuit diagram of another part of the block diagram as illustrated in FIG. 12.

As illustrated in FIG. 14, the respective arms of the output stage transistors Q1~Q12 are constituted by a combination of a NPN transistor and a PNP transistor so as to reduce loss caused thereby and to increase the output amplitude. For this reason two types of drivers of a PNP driver and a NPN driver are used in the driver 1450.

Figures 15, 16:
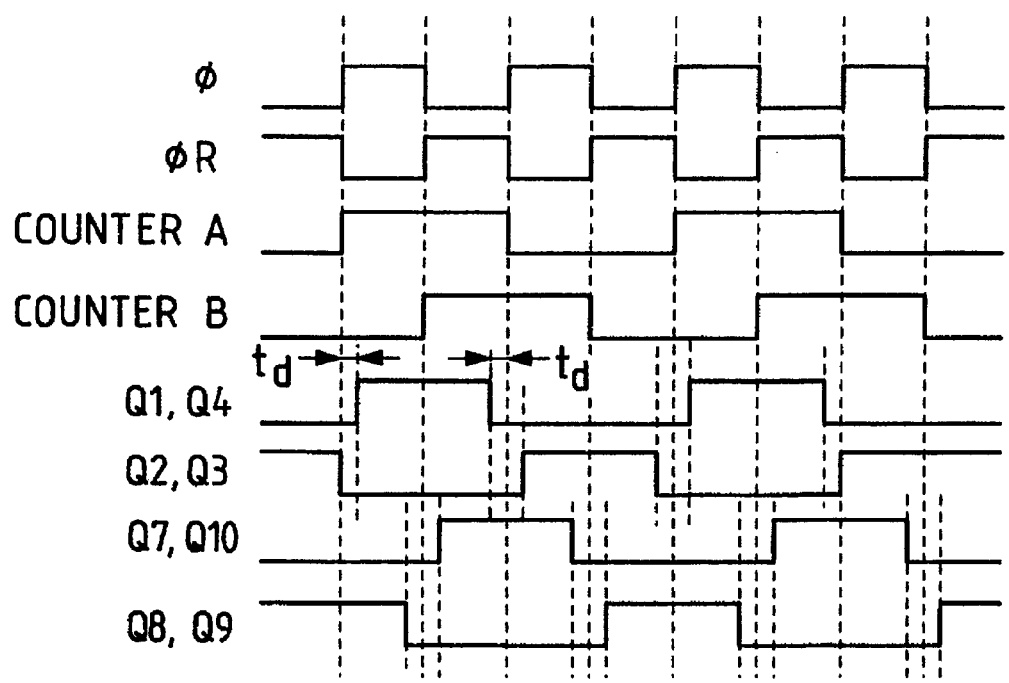
FIG. 15 is a timing chart for explaining the operation of the circuits illustrated in FIGS. 13 and 14.
FIG. 16 is a table for explaining the operation of the circuits illustrated in FIGS. 13 and 14.

FIG. 15 is a time chart for explaining the operation of the circuits as illustrated in FIG. 13 and FIG. 14. In FIG. 15 only the waveforms relating to the drive of the ultrasonic motor M1 are illustrated. Two phase pulses of which phases differ each other by 90° are produced by counters A and B based on clocks φ having a frequency of two times larger than the motor drive frequency and φR deviated by 180° from the clocks φ. Dead time td for short-circuiting prevention during switching of the output stage transistors is set at the least at 0.1 µs.

FIG. 16 shows switching conditions of all of the transistors Q1~Q12 under conditions in every 90° determined by dividing one cycle into four with respect to voltage waveforms of two phases and with respect to the forward/reverse (CW/CCW) control and the drives of ultrasonic motors M1 and M2, wherein "1" represents switched on condition and "0" represents switched off condition.

With the above operation diagram, it will be understood that the driving device of the ultrasonic motor as illustrated in FIG. 12 includes all the necessary functions for controlling the two motors other than the frequency tracking function.

Figure 17:
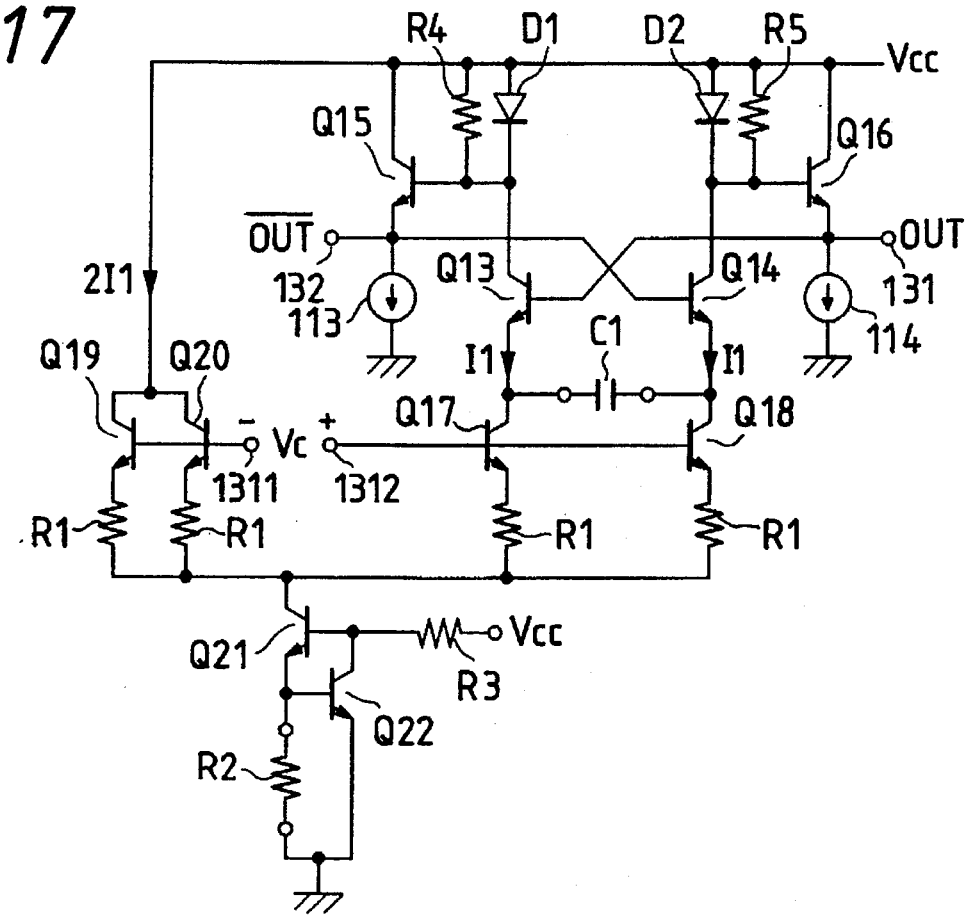
FIG. 17 is a further detailed circuit diagram of still another part of the block diagram as illustrated in FIG. 12.
Figure 18:
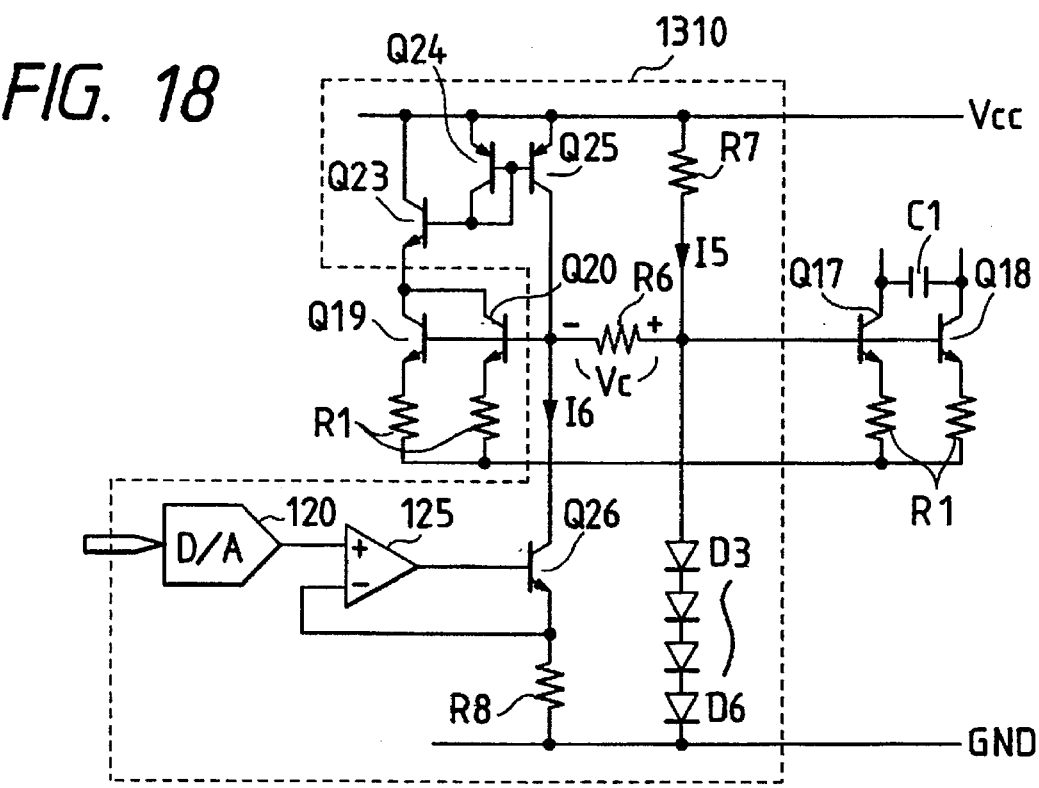
FIG. 18 is a further detailed circuit diagram of a further part of the block diagram as illustrated in FIG. 12.

The reasons why the device of the present invention can perform the frequency searching at a high resolution without monitoring the absolute value of the frequencies and can stably keep the driving frequency, is that a stable VCO or a variable frequency oscillation is realized. FIG. 17 and FIG. 18 show detailed circuits of the VCO and the control circuit therefor. In FIG. 17, an emitter coupled type VCO is constituted by such as cross connected transistors Q3~Q16, a timing use capacitor C1 and a constant current bias circuit including transistors Q17 and Q18. The oscillating frequency of the VCO is varied by providing a control voltage Vc between terminals 1311 and 1312 with reference to likely constituted another constant current circuit including transistors Q19 and Q20.

Because of VBE of diodes D1 and D2, the oscillation frequency of this type of VCO shows a temperature dependency of VBE such as f=I1/(4·C1·VBE), therefore the temperature dependency is compensated in the circuit by introducing a VBE dependent constant current source including transistors Q21 and Q22 and by generating a constant current of 4·I1=VBE/R2.

The oscillation frequency f, when a control voltage Vc is applied in FIG. 17 circuit, is expressed as follows.

$$f = \frac{I1}{4 \cdot C1 \cdot VBE} \left( 1 + \frac{Vc}{R1 \cdot I1} \right)$$

Herein, when assuming that the center value of f is 100 kHz, R1=500 Ω, I1=1 mA and the variable frequency range is 5 kHz (±2.5 kHz), the necessary value of the control voltage Vc is in a range of 0~25 mV.

FIG. 18 shows a control circuit of the VCO. The circuit surrounded by a dotted line is the control circuit. In FIG. 18 circuit a voltage dividing circuit formed by a resistor R7 and diodes D3~D6 provides a common base voltage to the constant current circuit transistors Q17 and Q18 in the VCO, and further another common base voltage is provided to the other constant current circuit transistors Q19 and Q20 via a low resistance resistor R6. Between the collectors and bases of the constant current transistors Q19 and Q20 a base current compensating circuit consisting of transistors Q23~Q25 is provided. Further, to the bases of the transistors Q19 and Q20 a constant current circuit consisting of a transistor Q26, a resistor R8 and an operational amplifier 125 is connected.

In the circuit thus constituted, when a control voltage Vi is applied to the input of the operational amplifier 125 via the D/A converter 120, current I6 flows via the resistor R6 to thereby generate a control voltage Vc=I6·R6 having an illustrated polarity. In this instance, since I6=Vi/R8, the control voltage Vc is expressed as Vc=R6/R8=Vi. Since a proper amount of R6 is less than several 100Ω and R8 is about a few KΩ, when the resistor R6 is constituted by connecting a plurality of unit resistors in parallel and the resistor R8 is constituted by connecting a plurality of unit resistors in series, resistors having limited resistance value variation and hardly affected by temperature change can be obtained with a high accuracy and without necessitating later adjustment. With the above constitution a resonant frequency can be searched with a high resolution by making use of digital data via the D/A converter.

Now, the details of a circuit which performs at a high speed the judgement of magnitude of the motor current is explained.

Figure 19:
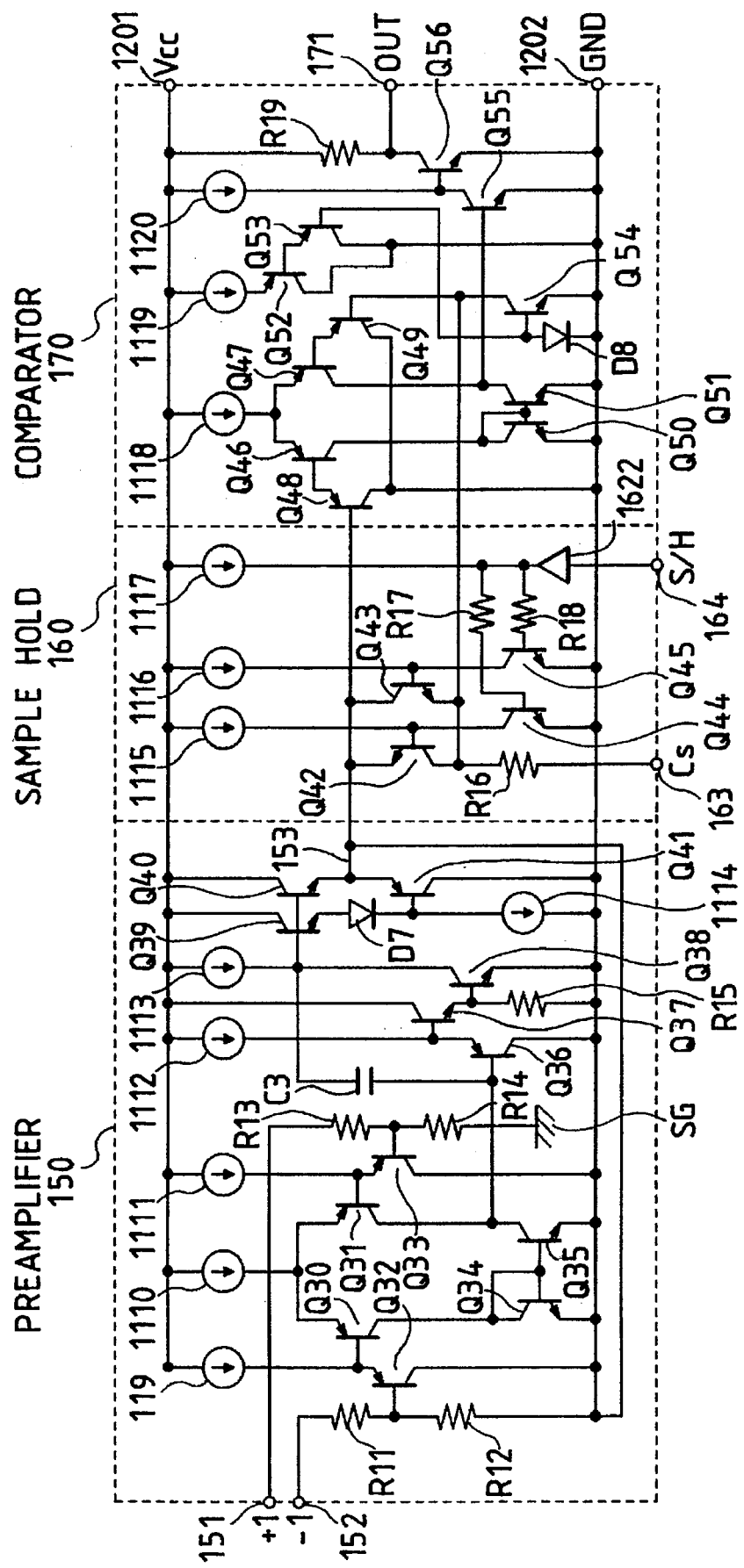
FIG. 19 is a further detailed circuit diagram of a still further part of the block diagram as illustrated in FIG. 12.

FIG. 19 shows an embodiment of the preamplifier, sample hold and comparator portions thereof. In FIG. 19 the preamplifier 150 is a Darlington connected operation amplifier of which input stage is constituted by NPN transistors Q30~Q33 and to which feed back resistors R11~R14 are added to determine the gain thereof. For example, when R11=R13=1KΩ, the gain is 10 and an input voltage range of about 0~100 mV is amplified.

The sample hold circuit 160 charges at a high speed and at a high accuracy a capacitor connected to a terminal 163 with the output voltage of the reamplifier 150. Therefore, the sampling switch is constituted by an antiparallel switch of transistors Q42 and Q43 having an independent base bias circuit so as to achieve compatibility between a large current charging and a low offset voltage characteristic. The on/off control of the switch is performed from terminal 164 via a gate circuit 1622.

The comparator 170 is constituted by a differential amplifier of which input stage uses PNP transistors Q46~Q49 so as to permit operation in a low input voltage range including grounding potential. Further, a base current compensating circuit constituting of transistors Q52~Q54 is provided at the input terminal on the side where the hold capacitor is connected to thereby compensate the base current at the input side of the comparator and to achieve a high input impedance. The output stage is set at a CMOS equivalent amplitude level to the full swing of a single power source.

The thus constituted circuit of the preamplifier 150, sample hold 160 and comparator 170 shows an accuracy of within a few mV when converted into the input, and performs a series of operations in a few µs.

In the above, the constitution and operation of the present invention are explained in detail with reference to the embodiments. However, the present invention does not limited to the embodiments which can be modified according to the necessity under the general concept of the present invention.

In the explanation of the present invention with reference to FIG. 11, the resonant frequency search is performed successively from a lower frequency to a higher frequency, however the searching direction can be reversed, in that from a higher frequency to a lower frequency. Further, the unit interval of frequency alternation is not necessarily required to be constant all over, but two stage step widths can be used wherein the searching is started with somewhat rough step interval or width and when the searching frequency comes to a certain value near the possible resonant frequency the step width is varied to a fine step width. This variable step width method permits an operation of a high resolution without increasing the total step number.

The VCO as explained in the embodiment shows a circuit wherein the frequency is changed via the D/A converter, however the frequency can be changed directly with digital values without routing the D/A converter. Namely, the portion can be constituted by a so called digital VCO or a numerical controlled oscillator (NCO) wherein the frequency is varied by inputting high frequency clock signals into a dividing circuit in a counter or a swallow counter and by finely setting the dividing rate of the counter. With this measure, although the logic circuit for the counter is complex, the oscillator requires no adjustment and the problems such as drift of the oscillation frequency is eliminated.

In the present embodiment, in order to speed up with a simple circuit the sample hold and the comparator are used for discriminating the magnitude of the motor current, however, the portion can be replaced by a high speed A/D converter.

According to another aspect of the present invention, an average current value signal is used for the detection signal of the resonant frequency in place of the conventional phase signal and the operation in the circuit is performed in an open loop in stead of the closed loop, thereby the circuit which shows a high resistance to noises and other disturbances and performs a stable and reliable frequency tracking operation at a high speed and at a high resolution is obtained, and thus a highly effecient and low cost ultrasonic motor driving device having a simple circuit structure is realized.

Further, the voltage adjustment of a plurality of high voltage focusing potentiometers in a CRT display device is easily performed with the small and simple device.

What is claimed is:

1. An ultrasonic motor comprising:
   a disk shaped piezoelectric stator having a center of gravity which revolves eccentrically through excitation by an ultrasonic resonant frequency signal; and
   a cap shaped plastic rotor fitted to said disk shaped piezoelectric stator through the outer circumference of said disk shaped piezoelectric stator, said cap shaped plastic rotor includes a side plate facing one of the major faces of said disk shaped piezoelectric stator and for transmitting a rotating torque for an external load and more than two and less than seven flat contacting members extending in the tangential direction of the outer circumference and in the axial direction of said disk shaped piezoelectric stator and disposed along the outer circumference of said disk shaped piezoelectric stator with an equal angular spacing, and is formed integrally through an injection molding with a plastic material having a high Young's modulus and a lower hardness than that of said disk shaped piezoelectric stator, thereby the elasticity of the cap shaped plastic rotor as a whole exerts substantially equal predetermined contacting pressures on the other circumference of said disk shaped piezoelectric stator through said respective flat contacting members.

2. An ultrasonic motor according to claim 1, wherein each of said flat contacting members further includes a portion extending axially beyond said side plate which controls the contacting pressure of said respective flat contacting members.

3. An ultrasonic motor according to claim 1, wherein said cap shaped plastic rotor further includes a ring shaped cylinder connecting said respective flat contacting members.

4. An ultrasonic motor according to claim 3, wherein each of said flat contacting members is a cantilever extending from the inner face of said ring shaped cylinder.

5. An ultrasonic motor according to claim 3, wherein said cap shaped plastic rotor further includes a plurality of side plate supporting members connecting said ring shaped cylinder with said side plate.

6. An ultrasonic motor according to claim 5, wherein the outer circumference of said disk shaped piezoelectric stator and the mating surface of said flat contacting members of said cap shaped plastic rotor are inclined.

7. An ultrasonic motor according to claim 1, wherein a number of the flat contacting members is three.

* * * * *

UNITED STATES PATENT AND TRADEMARK OFFICE
CERTIFICATE OF CORRECTION

PATENT NO. : 5,631,517
DATED : May 20, 1997
INVENTOR(S) : Kazuo Kato, et. al.

It is certified that error appears in the above-identified patent and that said Letters Patent is hereby corrected as shown below:

Title page, item [54], after "Driving" insert -- Device --.

| Column | Line | |
|---|---|---|
| 1 | 1 | After "DRIVING" insert --DEVICE--. |
| 1 | 49 | Change "distrube" to --disturb--. |
| 1 | 45 | Before "each" insert --to--. |
| 1 | 67 | Delete "by product". |
| 2 | 20 | After "drawing" insert --method--; change "an" to --the--. |
| 2 | 36 | Change "examples" to --example--. |
| 2 | 37 | Delete "as". |
| 2 | 48 | Change "ceased" to --forced--. |
| 2 | 60 | Change "later" to --latter--; after "technology" insert --,--. |
| 2 | 61 | Change "searching" to --search--; after "required" insert --,--. |

UNITED STATES PATENT AND TRADEMARK OFFICE
CERTIFICATE OF CORRECTION

PATENT NO. : 5,631,517
DATED : May 20, 1997
INVENTOR(S) : Kazuo Kato, et. al.

It is certified that error appears in the above-identified patent and that said Letters Patent is hereby corrected as shown below:

| Column | Line | |
|---|---|---|
| 2 | 62 | Change "complexed" to --complicated--; change "thereby is" to --is thereby--. |
| 3 | 11 | After "Additionally" insert --,--. |
| 3 | 27 | Change "dimentional" to --dimensional--. |
| 3 | 53 | Before "variable" delete "a". |
| 4 | 23 | Before "detected" change "are" to --is--. |
| 7 | 21 | Delete "of four". |
| 7 | 23 | After "structure" insert --,--. |
| 7 | 58 | Change "application" to --applications--. |
| 7 | 61 | After "device" delete "of"; after "illustrated in" do not start new paragraph. |
| 7 | 62 | Before "In the present" start new paragraph. |
| 8 | 18 | Change "an" to --a--. |

UNITED STATES PATENT AND TRADEMARK OFFICE
CERTIFICATE OF CORRECTION

PATENT NO. : 5,631,517
DATED : May 20, 1997
INVENTOR(S) : Kazuo Kato, et. al.

It is certified that error appears in the above-identified patent and that said Letters Patent is hereby corrected as shown below:

| Column | Line | |
|--------|------|---|
| 8 | 60 | Change "voltgae" to --voltage--. |
| 9 | 24 | Change "point" to --points--. |
| 9 | 30 | After "however" insert --,--. |
| 9 | 31 | After "limited" insert --to--. |
| 9 | 54 | Change "upto" to --up to--. |
| 9 | 56 | Before "typical" insert --the--; change "example" to --examples--. |
| 10 | 8 | Change "rectfying" to --rectifying--. |
| 10 | 17 | Before "high" delete "a". |
| 11 | 15 | Change "minimized" to --minimize--. |
| 12 | 7 | Change "a" to --an--. |
| 12 | 39 | Change "avarage" to --average--. |
| 12 | 66 | Change "followings" to --following--. |
| 12 | 67 | Change "operation" to --operations--. |

UNITED STATES PATENT AND TRADEMARK OFFICE
CERTIFICATE OF CORRECTION

PATENT NO. : 5,631,517
DATED : May 20, 1997
INVENTOR(S) : Kazuo Kato, et. al.

It is certified that error appears in the above-identified patent and that said Letters Patent is hereby corrected as shown below:

| Column | Line | |
|---|---|---|
| 14 | 13 | Change "motor" to --motors--. |
| 14 | 14 | Change "Potenti-" to --potenti- --. |
| 15 | 45 | After "therfor." start new paragraph. |
| 15 | 51 | Change "constituted" to --constitute--. |
| 16 | 21 | Change "Vc=R6/R8=Vi" to --Vc=R6/R8•Vi--. |
| 17 | 1 | Change "does" to --is--. |
| 17 | 40 | Change "in stead" to --instead--. |

Signed and Sealed this

Thirteenth Day of January, 1998

Attest:

Attesting Officer

BRUCE LEHMAN
Commissioner of Patents and Trademarks